United States Patent
Pibre et al.

(10) Patent No.: US 11,603,468 B2
(45) Date of Patent: Mar. 14, 2023

(54) TYPE II PHOTOINITIATOR SYSTEM AND METHOD FOR FORMING CROSSLINKING SILICONE COMPOSITIONS

(71) Applicants: ELKEM SILICONES FRANCE SAS, Lyons (FR); UNIVERSITE DE HAUTE ALSACE, Mulhouse (FR)

(72) Inventors: Guillaume Pibre, Lezoux (FR); Jean-Marc Frances, Meyzieu (FR); Xavier Allonas, Mulhouse (FR); Ahmad Ibrahim, Mulhouse (FR); Christian Maliverney, Saint Julien sur Bibost (FR); Perrine Theil, Saint Pierre de Chandieu (FR)

(73) Assignees: ELKEM SILICONES FRANCE SAS, Lyons (FR); UNIVERSITE DE HAUTE ALSACE, Mulhouse (FR)

( * ) Notice: Subject to any disclaimer, the term of this patent is extended or adjusted under 35 U.S.C. 154(b) by 0 days.

(21) Appl. No.: 17/159,417

(22) Filed: Jan. 27, 2021

(65) Prior Publication Data
US 2021/0147684 A1 May 20, 2021

Related U.S. Application Data

(62) Division of application No. 16/065,258, filed as application No. PCT/EP2016/082456 on Dec. 22, 2016, now Pat. No. 10,954,384.

(30) Foreign Application Priority Data

Dec. 22, 2015 (FR) ........................................ 1563147

(51) Int. Cl.
| | | |
|---|---|---|
| C08L 83/04 | (2006.01) | |
| C09D 183/04 | (2006.01) | |
| C08K 5/07 | (2006.01) | |
| C08K 5/45 | (2006.01) | |
| C08G 77/20 | (2006.01) | |
| C08G 77/12 | (2006.01) | |

(52) U.S. Cl.
CPC ............... *C08L 83/04* (2013.01); *C08K 5/07* (2013.01); *C08K 5/45* (2013.01); *C09D 183/04* (2013.01); *C08G 77/12* (2013.01); *C08G 77/20* (2013.01); *C08L 2312/06* (2013.01)

(58) Field of Classification Search
CPC ... C09D 183/04; C08L 83/04; C08L 2312/06; C08K 5/07; C08K 5/45; C08K 5/0025; C08G 77/04; C08G 77/08; C08G 77/12; C08G 77/20
USPC .......................................... 522/99, 172, 148
See application file for complete search history.

(56) References Cited

U.S. PATENT DOCUMENTS

| | | |
|---|---|---|
| 4,064,027 A | 12/1977 | Gant |
| 4,558,082 A | 12/1985 | Eckberg |
| 4,585,669 A | 4/1986 | Eckberg |
| 9,834,648 B2 | 12/2017 | Pouget et al. |
| 2013/0059105 A1 | 3/2013 | Wright et al. |
| 2019/0169478 A1 | 6/2019 | Kong |

FOREIGN PATENT DOCUMENTS

| | | | |
|---|---|---|---|
| EP | 0070746 | 1/1983 | |
| EP | 0442068 | 8/1991 | |
| WO | 9740090 | 10/1997 | |
| WO | WO-9740090 A2 * | 10/1997 | ................ C08F 8/28 |
| WO | 2015090551 | 6/2015 | |

OTHER PUBLICATIONS

International Search Report for PCT/EP2016/082456, English Translation attached to original, Both completed by the European Patent Office dated Jan. 31, 2017, All together 7 Pages.
Anthony F. Jacobine et al. Radiation curing: Science and technology Jan. 1, 1992, pp. 181-240, XP055287737, "Photopolymerlzable Silicone Monomers, Oligomers, and Resins".

* cited by examiner

*Primary Examiner* — Sanza L. McClendon
(74) *Attorney, Agent, or Firm* — Brooks Kushman P.C.

(57) ABSTRACT

A system and method for forming a silicone composition C that is crosslinkable by exposure to radiation with a wavelength between 200 nm and 450 nm, having:
at least one radical photoinitiator A; and
at least one co-initiator B chosen from compounds having at least one hydrogen atom bonded to a silicon atom.

18 Claims, No Drawings

TYPE II PHOTOINITIATOR SYSTEM AND METHOD FOR FORMING CROSSLINKING SILICONE COMPOSITIONS

CROSS-REFERENCE TO RELATED APPLICATIONS

This application is a Divisional of U.S. patent application Ser. No. 16/065,258 filed Jun. 22, 2018 now U.S. Pat. No. 10,954,384 which is the U.S. national phase of PCT Application No. PCT/EP2016/082456 filed on Dec. 22, 2016, which claims priority to FR Patent Application No. 1563147 filed on Dec. 22, 2015, the disclosures of which are incorporated in their entirety by reference herein.

The object of the present invention is the use of a type II photoinitiator system for the radical crosslinking of silicone compositions, in particular of acrylic silicone compositions.

The use of plastic films as supporting materials for the application of silicone coatings in order to create non-stick coatings requires appropriate technology. In fact, most of these plastic films are heat-sensitive. Thus, dimensional deformation of the film occurs during the coating and drying of the silicone layer in thermal furnaces under the combined effect of the tensile forces and the temperature imposed on the films. The crosslinking technology for functional silicone oils under ultraviolet (UV) radiation makes it possible to dispense with the use of high temperatures and thus to crosslink anti-stick layers without impacting the supports. In addition, this technology has the advantage of achieving high productivity without being energy intensive and without using solvents. Plastic substrates are materials of choice for many applications and their use is constantly growing. Also, research and innovation is essential in the field of crosslinking of thin films of silicone under UV.

The silicone compositions are generally crosslinked under UV or visible radiation emitted by doped or non-doped mercury vapor lamps whose emission spectrum extends from 200 nm to 450 nm. Light sources such as light-emitting diodes, better known by the acronym "LED" that deliver a specific UV or visible light may also be used.

From a general point of view, the crosslinking under irradiation is promoted by a photoinitiator molecule. Considerable literature describes photoinitiators and their uses. In the field of radical polymerization of acrylic silicone compositions, the photoinitiator molecules commonly used are so-called type I photoinitiators. Under irradiation, these molecules split and produce free radicals. These radicals induce the polymerization initiation reaction which results in the hardening of the compositions. Many initiatives have been implemented so that type I photoinitiators have characteristics that allow their use in acrylic silicone formulations in order to obtain anti-stick coatings. Throughout this application, the term "type I photoinitiators" is understood to refer to compounds that are well known to those skilled in the art, and that are capable of generating free radical initiators of polymerization under UV excitation through intramolecular homolytic fragmentation.

There are also type II photoinitiator systems comprising a radical photoinitiator and a co-initiator. In photoinitiator systems of type II, the photoinitiators used are capable of generating free radicals initiating polymerization by reaction with another compound called a co-initiator, wherein the reaction causes the transfer of a hydrogen from the co-initiator to the photoinitiator. The photoinitiators used in type II photoinitiator systems are referred to as "type II photoinitiators".

To date, there is no type II photoinitiator system that comprises a radical photoinitiator and a co-initiator that is effective for the polymerization of acrylic silicone compositions. The object of the present invention is to provide a radical polymerizable or crosslinkable silicone composition comprising a type II photoinitiator system that is suitable for crosslinking silicone compositions, in particular by exposure to radiation.

The present invention also aims to provide a radical polymerizable or crosslinkable silicone composition comprising a type II photoinitiator system that is adapted for the crosslinking of silicone compositions, in particular by exposure to radiation, that is miscible in the silicone composition and offers good properties of absorption of light radiation at the wavelengths considered for the application, i.e. between 200 nm and 450 nm.

The present invention also aims to provide a method for preparing a film or a coating on a substrate from the radical-polymerizable silicone composition according to the invention.

The present invention also aims to provide a substrate coated with a film or a coating obtained from the radical-polymerizable silicone composition according to the invention.

Another object of the present invention is to provide silicone compositions which make it possible to obtain non-stick coatings which crosslink under radiation, and in particular under UV radiation, based on organopolysiloxanes comprising (meth)acrylate groups, in particular ester (meth)acrylic or epoxy acrylate or polyether acrylate groups.

Thus, the present invention relates to a silicone composition C that may be crosslinked by exposure to radiation with a wavelength between 200 nm and 450 nm, comprising:

- at least one radical photoinitiator A;
- at least one co-initiator B chosen from among compounds comprising at least one hydrogen atom bonded to a silicon atom; and
- at least one organopolysiloxane D comprising at least one (meth)acrylate group;

wherein the co-initiator B comprises at least 0.05 moles of Si—H functions per 100 g of the co-initiator B.

A hydrogen atom bonded to a silicon atom means an Si—H function or an Si—H bond. According to the invention, in order to define the co-initiators B, the terms "compounds comprising at least one hydrogen atom bonded to a silicon atom" or "compounds comprising at least one Si—H bond" or "compounds comprising at least one hydrogenosilyl function" or "compounds comprising at least one Si—H function", may be used without distinction.

The present invention is therefore based on the use of a specific type II photoinitiator system comprising the combination of a radical photoinitiator A and a co-initiator B chosen from compounds comprising at least one hydrogen atom bound to a silicon atom.

Throughout the application, the term "crosslinking" is understood to mean the hardening of the composition by polymerization reactions of the meth(acrylate) functions.

The term "silicone composition crosslinkable by exposure to radiation" means a composition comprising at least one organo-polysiloxane capable of being hardened by exposure to radiation, in particular UV radiation, with a wavelength between 200 nm and 450 nm.

In order to obtain photocrosslinking through radiation, the composition comprises a type II photoinitiator system which, under the effect of the absorption of the incident light energy, releases free radicals into the medium. These radicals act as initiators of radical polymerization of (meth) acrylic functions. Since it initiates the hardening of the composition, the photoinitiator system is an essential element of this patent application.

The type II photoinitiator system according to the invention, comprising a photoinitiator molecule A in combination with a co-initiator molecule B comprising at least one hydrogen atom bonded to a silicon atom, and introduced into a silicone composition C, comprising at least an organopolysiloxane D with (meth)acrylic functions, makes it possible to obtain crosslinked films through irradiation, in particular with non-stick properties.

Co-Initiator

According to the invention, the co-initiator B is a compound comprising at least one hydrogen atom bonded to a silicon atom.

According to the invention, the co-initiator B is preferably an organosilicon compound comprising at least one hydrogen atom bonded to a silicon atom.

According to one embodiment, the silicone compositions C according to the invention comprise a mixture of co-initiators.

Among the organosilicon compounds comprising at least one hydrogen atom bonded to a silicon atom, mention may be made of silanes S and organohydrogenpolysiloxanes H.

Among the silanes S, may be mentioned the compounds of formula $R_3SiH$, wherein the groups R, which are identical or different, are chosen from the group consisting of H, $(C_1-C_{20})$ alkyl radicals and $(C_6-C_{10})$ aryl radicals. According to the invention, the groups R may also represent radicals —$SiR'_3$, wherein groups R', which are identical or different, are chosen from the $(C_1-C_{10})$ alkyl radicals and the $(C_6-C_{10})$ aryl radicals.

In particular, R may represent a phenyl group or an alkyl group, especially methyl, ethyl or octadecyl. R may also represent a —$SiMe_3$ group.

As examples of silanes S that may be used as co-initiators B according to the invention, mention may be made of 2-triethylsilane, dimethylphenylsilane, diphenylsilane, triphenylsilane and tris(trimethyl-silyl)silane.

As silanes S, may also be mentioned N,N-diethyl-1,1-dimethylsilylamine, 1,1,3,3-tetramethyldisilazane, N,N',N''-tri-tert-butyl-silanetriamine, pentamethyldisilane or chlorodiphenylsilane.

According to one embodiment, the co-initiator B according to the invention is chosen from the group consisting of tris(trimethyl-silyl)silane (TTMSS), triphenylsilane (TPSi) and octadecylsilane (OctaSi).

According to one embodiment, the co-initiator B according to the invention comprises at least one siloxane bond and at least one hydrogen atom bonded to a silicon atom. By siloxane bond is meant a bond ≡Si—O—Si≡ bond. According to one embodiment, the co-initiator B according to the invention is chosen from organohydrogenpolysiloxanes H.

According to a preferred embodiment, the organohydrogen-polysiloxane H comprises at least two, and preferably three, hydrogen atoms each bonded to different silicon atoms.

According to a preferred embodiment, the organohydrogen-polysiloxane H comprises:
(i) at least two units of formula (H1),

$$H_dL_eSiO_{(4-(d+e))/2} \qquad (H1)$$

in which:
  L represents a monovalent radical different from a hydrogen atom,
  H represents the hydrogen atom,
  d and e represent integers, wherein d is 1 or 2, e is 0, 1 or 2, and (d+e) is 1, 2 or 3;
(ii) and optionally other units of formula (H2):

$$L_fSiO_{(4-f)/2} \qquad (H2)$$

in which:
  L has the same meaning as above, and
  f represents an integer equal to 0, 1, 2 or 3.

It is to be understood in formulas (H1) and (H2) above that if several L groups are present, they may be identical or different. In the formula (H1), the symbol d may preferentially be 1. Moreover, in the formula (H1) and in the formula (H2), L may preferably represent a monovalent radical chosen from the group consisting of an alkyl group having 1 to 8 carbon atoms, optionally substituted with at least one halogen atom, and an aryl group. L may advantageously represent a monovalent radical chosen from the group consisting of methyl, ethyl, propyl, 3,3,3-trifluoropropyl, xylyl, tolyl and phenyl. Examples of units of formula (H1) are as follows: $H(CH_3)_2SiO_{1/2}$, $H(CH_3)SiO_{2/2}$ and $H(C_6H_5)SiO_{2/2}$.

The organohydrogenpolysiloxane H may have a linear, branched, cyclic or network structure. In the case of linear organohydrogenpolysiloxanes, these may essentially consist of:
  siloxyl "D" units selected from the units of formulas $H(CH_3)_2SiO_{1/2}$, $H(CH_3)SiO_{2/2}$ and $H(C_6H_5)SiO_{2/2}$ (also referred to as D' unit) and $L_2SiO_{2/2}$; and
  siloxyl "M" units chosen from the units of formulas $SiO_{1/2}$ (also referred to as M' unit) and $L_3SiO_{2/2}$,
  wherein the symbol L has the same meaning as above and the symbol H denotes a hydrogen atom.

These linear organohydrogenpolysiloxanes H may be oils having a dynamic viscosity at 25° C. of between 1 mPa·s and 100,000 mPa·s, preferably between 1 mPa·s and 5,000 mPa·s, and even more preferably between 1 mPa·s and 2,000 mPa·s.

All the viscosities referred to herein correspond to a dynamic viscosity quantity at 25° C. called "Newtonian", i.e. the dynamic viscosity that is measured, in a manner known per se, with a Brookfield viscometer at a shear rate gradient that is sufficiently low in order that the measured viscosity is independent of the velocity gradient.

When it concerns cyclic organohydrogenpolysiloxanes, these may consist of "D" siloxyl units selected from among the units of formulas $HLSiO_{2/2}$ and $L_2SiO_{2/2}$, or of siloxyl units of formula $HLSiO_{2/2}$ alone. The units of formula $L_2SiO_{2/2}$ may be, in particular, dialkylsiloxy or alkylarylsiloxy. These cyclic organohydrogenpolysiloxanes may have a dynamic viscosity at 25° C. of between 1 mPa·s and 5,000 mPa·s.

Examples of organohydrogenpolysiloxane H are:
  polydimethylsiloxanes with hydrogenodimethylsilyl ends;
  poly(dimethylsiloxane-co-hydrogenomethylsiloxane) with tri-methylsilyl ends;
  poly(dimethylsiloxane-co-hydrogenomethylsiloxane) with hydrogenodimethylsilyl ends;

polyhydrogenomethylsiloxanes with trimethylsilyl ends; and cyclic hydrogenomethylpolysiloxanes.

In the case of branched or networked organo-hydrogenpolysiloxanes H, these may furthermore comprise:

siloxyl "T" units chosen from the units of formulas $HSiO_{3/2}$ and $LSiO_{3/2}$;

siloxyl units "Q" of formula $SiO_{4/2}$, wherein the symbol H represents a hydrogen atom and L has the same meaning as above.

According to one embodiment, the co-initiator B comprises at least 0.08 mol of Si—H functions per 100 g of co-initiator B, more preferably between 0.08 mol and 2.5 mol of Si—H functions per 100 g of co-initiator B, and even more preferentially between 0.08 mol and 1.8 mol of Si—H functions per 100 g of co-initiator B.

According to one embodiment, the co-initiator B is an organohydrogenopolysiloxane polymer H comprising at least 0.05 mol of Si—H functions per 100 g of polymer, preferably at least 0.08 mol of Si—H functions per 100 g of polymer, more preferably between 0.08 mol and 2.5 mol of Si—H functions per 100 g of polymer, and still more preferably between 0.08 mol and 1.8 mol of Si—H functions per 100 g of polymer.

According to one embodiment, in the crosslinkable silicone compositions C according to the invention, the concentration of Si—H functions is less than or equal to 0.01 mol/100 g of composition C, preferably less than 0.006 mol/100 g of composition C, and more preferably less than 0.005 mol/100 g of composition C.

According to one embodiment, the crosslinkable silicone compositions C according to the invention comprise between 0.0001 mole and 0.01 mole of Si—H functions per 100 g of composition C, especially between 0.0002 mole and 0.01 mole of functions Si—H per 100 g of composition C, and preferably between 0.0002 mole and 0.006 mole of Si—H functions per 100 g of composition C.

Radical Photoinitiator A

According to the invention, the photoinitiator used is a radical photoinitiator A.

In order to polymerize organopolysiloxanes, preferably functionalized with (meth)acrylate groups, those skilled in the art will be able to choose a suitable radical photoinitiator A that is capable of being used in a type II photoinitiator system, and that absorbs luminous radiation with a wavelength between 200 nm and 450 nm.

According to one embodiment, the radical photoinitiator A is chosen from the group consisting of benzophenone and its derivatives, thioxanthone and its derivatives, anthraquinone and its derivatives, benzoyl ester formates, camphorquinone, benzil, phenanthrenequinone, coumarins and cetocoumarines and their mixtures.

By benzophenone derivatives is meant substituted benzophenones and polymeric versions of benzophenone.

The term "thioxanthone derivatives" refers to substituted thioxanthones and to anthraquinone derivatives, to substituted anthraquinones, in particular to anthraquinone sulfonic acids and acrylamido-substituted anthraquinones.

According to the invention, among benzoylate formate esters, may be mentioned methyl benzoylformate, optionally bifunctional.

As examples of radical photoinitiators A, mention may be made, in particular, of the following products: isopropylthioxanthone; benzophenone; camphorquinone; 9-xanthenone; anthraquinone; 1-4 dihydroxyanthraquinone; 2-methylanthraquinone; 2,2'-bis (3-hydroxy-1,4-naphthoquinone); 2,6-dihydroxyanthraquinone; 1-hydroxycyclohexyl-phenylketone; 1,5-dihydroxyanthraquinone; 1,3-diphenyl-1,3-propane-dione; 5,7-dihydroxyflavone; dibenzoylperoxide; 2-benzoylbenzoic acid; 2-hydroxy-2-methylpropionophenone; 2-phenylacetophenone; anthrone; 4,4'-dimethoxybenzoin; phenanthrenequinone; 2-ethylanthraquinone; 2-methylanthraquinone; 2-ethylanthraquinone; 1,8-dihydroxyanthraquin-one; dibenzoyl peroxide; 2,2-dimethoxy-2-phenylacetophenone; benzoin; 2-hydroxy-2-methylpropiophenone; benzaldehyde; 4-(2-hydroxyethoxy) phenyl-(2-hydroxy-2-methylpropyl) ketone; benzoyl-acetone; ethyl (2,4,6-trimethylbenzoyl) phenyl phosphinate and mixtures thereof.

As examples of commercial products of radical photoinitiators A according to the invention, mention may be made, among the benzophenone derivatives, of Esacure® TZT, Speedcure® MBP, Omnipol® BP and thioxanthone derivatives, Irgacure® 907, Omnipol® TX and Genopol® TX-1 products.

According to one embodiment, the radical photoinitiator A according to the invention is selected from the group consisting of: benzophenone, substituted benzophenones, thioxanthone, substituted thioxanthones, and mixtures thereof.

Among thioxanthones, substituted or unsubstituted, may be mentioned, for example, the following compounds:

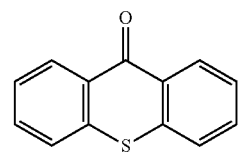

(1)

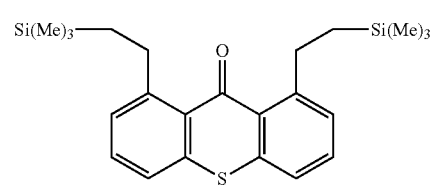

(2)

Among the substituted benzophenones may be mentioned disubstituted benzophenones (1 substitution on each aromatic ring) and the compounds of formula (IV) below:

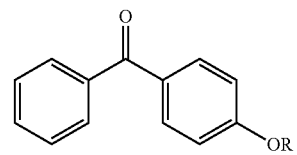

(IV)

wherein R is selected from among:

H;

the $Si(R^1)_3$ groups, the $R^1$ groups, identical or different, are $(C_1-C_6)$ alkyl groups; and the ($C_1$-$C_{20}$) alkyl groups, optionally substituted with an group $OR^2$, wherein $R^2$ corresponds to the formula (V) below:

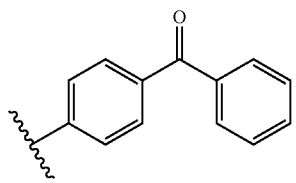

(V)

wherein the —C(=O)—$R^3$ groups, wherein the radical R3 is chosen from linear or branched ($C_1$-$C_{20}$) groups;

the -A-CH=$CH_2$ groups, wherein the radical A is chosen from:
- a covalent bond,
- a —C(=O)— group, or
- a group of formula (VI) below:

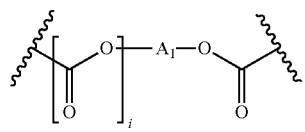

(VI)

in which i is 0 or 1 and $A^1$ represents a ($C_1$-$C_{20}$) alkylene radical, preferably linear.

Among the compounds of formula (IV), mention may be made of the following compounds (3) to (13) and (15) to (17):

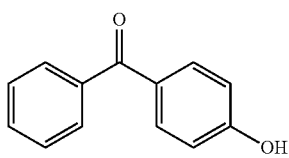 [SMILES: O=C(c1ccccc1)c1ccc(O)cc1]
(3)

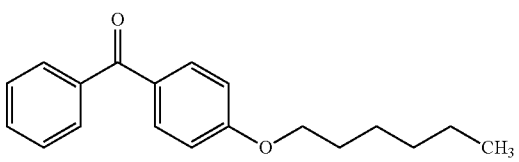
(4)

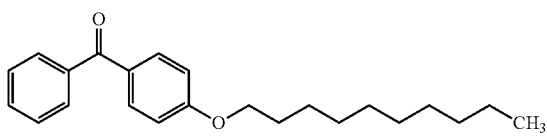
(5)

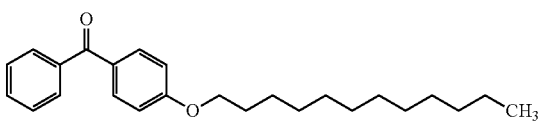
(6)

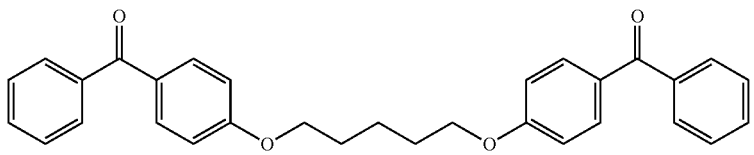
(7)

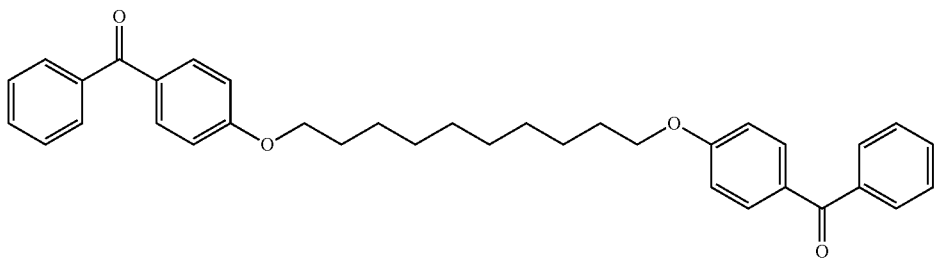
(7bis)

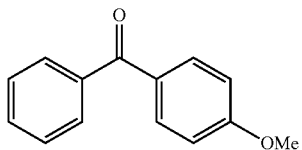 [SMILES: COc1ccc(C(=O)c2ccccc2)cc1]
(8)

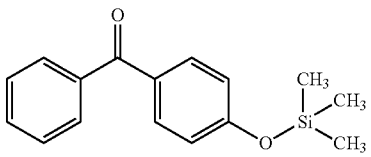
(9)

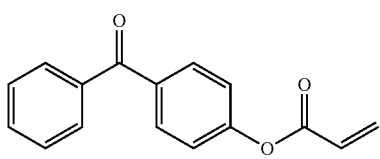
(10)

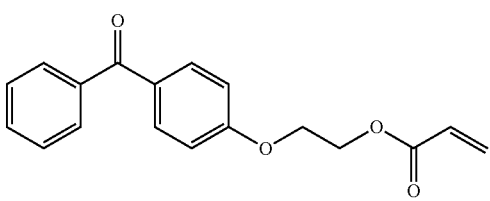
(11)

-continued

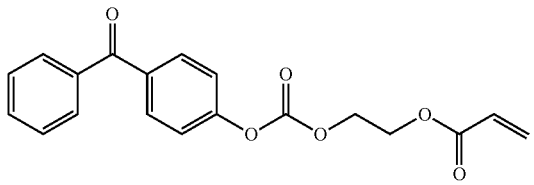
(12)

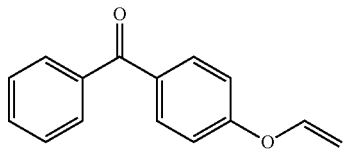
(13)

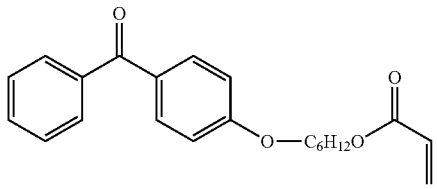
(15)

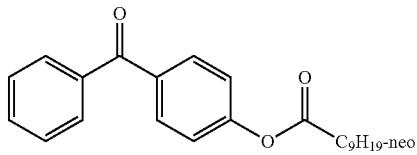
(16)

(17)

As another example of benzophenone that is useful according to the invention, mention may be made of the compound (14):

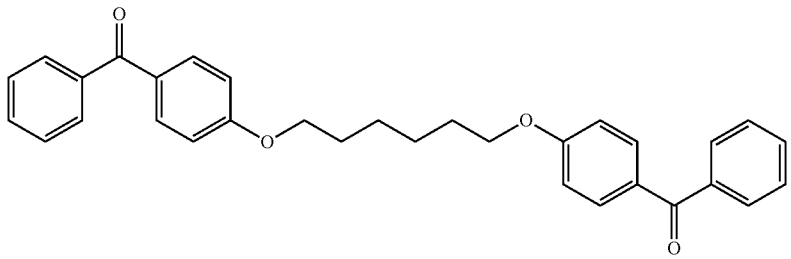
(14)

This compound corresponds to the product Ebecryl P36 (CAS: 85340-63-2).

Preferably, the radical photoinitiator A is chosen from among the group consisting of: benzophenone, 2-methylbenzophenone, 3-methylbenzophenone, 2,5-dimethylbenzophenone, 3,4-dimethylbenzo-phenone, 2,4-dimethyl benzophenone, 4-isopropylbenzophenone and 2-trimethylsilyloxy benzophenone and mixtures thereof.

According to one embodiment, the ratio between the number of moles of photoinitiator A and the number of moles of functions Si—H of co-initiator B in composition C is greater than or equal to 0.5, preferably between 0.5 and 20, and even more preferably between 1 and 10.

According to a preferred embodiment, the ratio between the number of moles of photoinitiator A and the number of moles of Si—H functions of the co-initiator B in the composition C, is between 1 and 5.

According to one embodiment, the crosslinkable silicone compositions C according to the invention comprise at least 0.0003 moles of radical photoinitiator A per 100 g of composition C, and preferably at least 0.0005 moles of radical photoinitiator A per 100 g of composition C. Preferably, the mole content of radical photoinitiator A in the compositions C of the invention is between 0.0003 and 0.015 mole per 100 g of composition C, and still more preferably between 0.0005 and 0.015 mole per 100 g of composition C.

Organopolysiloxanes D

According to the invention, the crosslinkable silicone compositions C according to the invention comprise at least one organopolysiloxane D comprising at least one (meth)acrylate group.

As a representative of (meth)acrylate functions carried by silicone and particularly suitable for the invention, mention may be made more particularly of acrylate derivatives, methacrylates, ethers of (meth)acrylates and esters of (meth)acrylates linked to the polysiloxane chain via an Si—C bond.

According to one embodiment, the organopolysiloxane D comprises:

a1) at least one unit of formula (I) below:

$$R_a Z_b SiO_{(4-a-b)/2} \quad (I)$$

in which:

the symbols R, identical or different, each represent a linear or branched $C_1$-$C_{18}$ alkyl group, a $C_6$-$C_{12}$ aryl or aralkyl group, optionally substituted, preferably with halogen atoms, or an alkoxy —$OR^4$ radical; wherein $R^4$ is a hydrogen atom or a hydrocarbon radical comprising from 1 to 10 carbon atoms, the symbols Z are monovalent radicals of formula -y-(Y')$_n$ in which:

y represents a linear or branched $C_1$-$C_{18}$ alkylene polyvalent radical optionally extended by bivalent $C_1$-$C_4$ oxyalkylene or polyoxyalkylene radicals optionally substituted by a hydroxyl radical, Y' represents a monovalent alkenylcarbonyloxy radical, and n is 1, 2 or 3, and a is an integer equal to 0, 1 or 2, while b is an integer equal to 1 or 2, and the sum a+b=1, 2 or 3; and a2) optionally units of the following formula (II):

$$R_aSiO_{(4-a)/2} \quad (II)$$

in which:
the symbols R, which are identical or different, each represents a linear or branched $C_1$-$C_{18}$ alkyl group, a $C_6$-$C_{12}$ aryl or aralkyl group, optionally substituted, preferably with halogen atoms, and
a is an integer equal to 0, 1, 2 or 3.

In formulas (I) and (II) above, the symbol R may advantageously represent a monovalent radical chosen from the group consisting of: methyl, ethyl, propyl, 3,3,3-trifluoropropyl, xylyl, tolyl and phenyl.

The organopolysiloxane D may have a linear, branched, cyclic or network structure. In the case of linear organopolysiloxanes, these may essentially consist of:
siloxyl "D" units selected from the units of formulas $R_2SiO_{2/2}$, $RZSiO_{2/2}$ and $Z_2SiO_{2/2}$;
siloxyl "M" units chosen from the units of formulas $R_3SiO_{1/2}$, $R_2ZSiO_{1/2}$, $RZ_2SiO_{1/2}$ et $Z_3SiO_{1/2}$; and
the symbols R and Z are as defined above in formula (I).

According to one embodiment, in formula (I) above, among the alkenylcarbonyloxy radicals Y' mentioned above, mention may be made of acryloxy [$CH_2=CH-CO-O-$] and the methacryloxy radicals: [($CH_3$)CH=CH—CO—O—] et [$CH_2=C(CH_3)-CO-O-$].

As an illustration of the symbol y in the units of formula (I), mention may be made of the radicals:
—$CH_2$—;
—($CH_2$)$_2$—;
—($CH_2$)$_3$—;
—$CH_2$—CH($CH_3$)—$CH_2$—;
—($CH_2$)$_3$—NH—$CH_2$—$CH_2$—;
—($CH_2$)$_3$—$OCH_2$—;
—($CH_2$)$_3$—[O—$CH_2$—CH($CH_3$)—]—;
—($CH_2$)$_3$—O—$CH_2$—CH(OH)(—$CH_2$—);
—($CH_2$)$_3$—O—$CH_2$—C($CH_2$—$CH_3$)[—($CH_2$)$_2$-]$_2$; and
—($CH_2$)$_2$-$C_6H_9$(OH)—.

Preferably, organopolysiloxane D has the following formula (III):

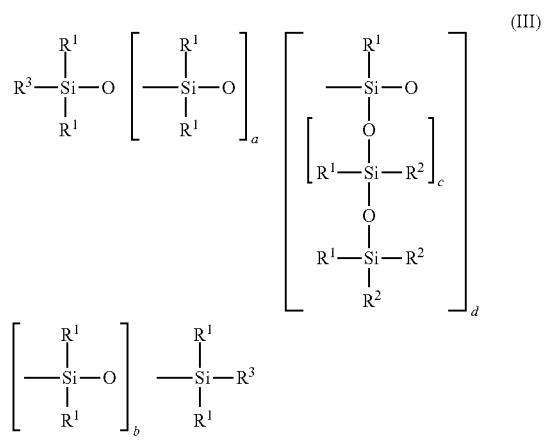

in which:
the symbols $R^1$, which may be identical or different, each represent a linear or branched $C_1$ to $C_{18}$ alkyl group, a $C_6$ to $C_{12}$ aryl or aralkyl group, optionally substituted, preferably by halogen atoms, or an alkoxy-$OR^4$ radical; wherein $R^4$ is a hydrogen atom or a hydrocarbon radical comprising from 1 to 10 carbon atoms, the symbols $R^2$ and $R^3$, which are identical or different, each represent either a radical $R^1$ or a monovalent radical of formula Z=-w-(Y')n in which:
w represents a linear or branched $C_1$-$C_{18}$ alkylene polyvalent radical optionally extended by $C_1$-$C_4$ bivalent oxyalkylene or polyoxyalkylene radicals optionally substituted by a hydroxyl radical,
Y' represents a monovalent alkenylcarbonyloxy radical, and
n is 1, 2 or 3, and
wherein a=0 to 1000, b=0 to 500, c=0 to 500, d=0 to 500 and a+b+c+d=0 to 2500, and
the condition that at least one symbol $R^2$ or $R^3$ represents the monovalent radical of formula Z.

According to a preferred embodiment, in formula (III) above:
c=0, d=0, a=1 to 1000, b=1 to 250, wherein the symbol $R^2$ represents the monovalent radical of formula Z, while the symbols $R^1$ and $R^3$ have the same meaning as above.

Even more preferably, in formula (III) above:
c=0, d=0, a=1 to 500, b=1 to 100, wherein the symbol $R^2$ represents the monovalent radical of formula Z and the symbols $R^1$ and $R^3$ have the same meaning as above.

According to one embodiment, the organopolysiloxane D according to the invention has the following formula:

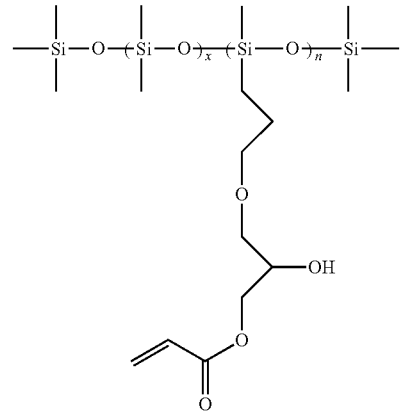

in which:
x is between 1 and 1000;
n is between 1 and 100.

The crosslinkable silicone compositions C according to the invention may further comprise at least one additive. As an additive, at least one additive for controlling the non-stick force of a silicone/adhesive interface may be included in the composition which is chosen from:
(i) organic (meth)acrylate derivatives, and
(ii) silicones with (meth)acrylate function(s).

Particularly suitable organic (meth)acrylate derivatives are epoxidized (meth)acrylates, (meth)acryloglyceropolyesters, (meth)-acrylourethanes, (meth)acrylopolyethers, (meth)acrylopolyesters, and (meth)acryloacrylic compounds. More particularly preferred are trimethylolpropane triacrylate, tripropylene glycol diacrylate and pentaerythritol tetraacrylate.

According to a preferred variant of the invention, the additive used is a silicone with (meth)acrylate function(s). As a representative of (meth)acrylate functions carried by silicone and particularly suitable for the invention, may be mentioned more particularly the acrylate derivatives, methacrylates, ethers of (meth)acrylates and esters of meth(acrylates) linked to the polysiloxane chain via an Si—C bond. Such acrylate derivatives are described, in particular, in patents EP 0 281 718, FR 2,632,960 and EP 0 940 458.

Other additives such as thiols or aromatic amines may be added to accelerate the crosslinking of the composition.

According to one embodiment, the composition C does not include platinum.

The present invention also relates to the use of the composition C according to the invention, for the preparation of silicone films with non-stick properties.

Preferably, to prepare these silicone films, compositions C as defined above are used, in which the ratio between the number of moles of photoinitiator A and the number of moles of Si—H functions of co-initiator B is between 0.5 and 20, preferably between 1 and 5, wherein the co-initiator B preferably comprises at least 0.08 mol, preferably between 0.1 mol and 2.5 mol, of Si—H functions per 100 g.

The present invention also relates to a silicone elastomer obtained by crosslinking a crosslinkable composition C as defined above.

The present invention also relates to a method for preparing silicone films with non-stick properties, comprising a step of crosslinking a crosslinkable composition C as defined above.

Preferably, in the method according to the invention, use is made of compositions C as defined above, in which the ratio between the number of moles of radical photoinitiator A and the number of moles of Si—H functions of the co-initiator B is between 0.5 and 20, preferably between 1 and 5, wherein the co-initiator B preferably comprises at least 0.08 mol, preferably between 0.1 mol and 2.5 mol, of Si—H functions per 100 g of co-initiator B.

According to one embodiment of the method of the invention, the crosslinking step is carried out under air or under an inert atmosphere. Preferably, this crosslinking step is carried out under an inert atmosphere.

According to one embodiment, the crosslinking step of the method according to the invention is carried out by radiation with a wavelength of between 200 nm and 450 nm, preferably under an inert atmosphere.

The present invention also relates to a method for preparing a coating on a substrate, comprising the following steps:
 the application of a crosslinkable composition C as defined above on a substrate, and
 the crosslinking of the composition C by exposure to radiation with a wavelength between 200 nm and 450 nm.

The UV radiation may be emitted by doped or non-doped mercury vapor lamps whose emission spectrum extends from 200 nm to 450 nm. Light sources such as light-emitting diodes, better known by the acronym "LED" that deliver a specific UV or visible light may also be used.

According to a preferred embodiment of the invention, the radiation is ultraviolet light having a wavelength of less than 400 nanometers.

According to a preferred embodiment of the invention, the radiation is ultraviolet light of wavelength greater than 200 nanometers.

The irradiation time may be short and is generally less than 1 second and is of the order of a few hundredths of a second for the low coating thicknesses. The crosslinking obtained is excellent even in the absence of any heating.

According to one embodiment, the crosslinking step is carried out at a temperature of between 10° C. and 50° C., preferably between 15° C. and 35° C.

Of course, the hardening speed may be adjusted in particular by the number of U.V. lamps used, the U.V. exposure time, and the distance between the composition and the U.V. lamp.

Composition C according to the invention without solvent, i.e. undiluted, may be applied using devices able to deposit, in a uniform manner, small amounts of liquid. For this purpose, for example, the device called "sliding helio" may be used, in particular comprising two superimposed cylinders: wherein the role of the lowest placed cylinder, immersed in the coating tank where the compositions are located, is to impregnate the highest placed cylinder with one very thin coating, while the role of the latter cylinder is then to deposit the desired quantities of the compositions with which it is impregnated on the paper, wherein such a dosage is obtained by adjusting the respective speed of the two cylinders which rotate in opposite directions to one another.

The amounts of composition C deposited on the supports are variable and generally range from 0.1 to 5 g/m$^2$ of treated surface. These amounts depend on the nature of the supports and the desired non-stick properties. They are most often between 0.5 and 1.5 g/m$^2$ for non-porous supports.

This method is particularly suitable for preparing a non-stick silicone coating on a substrate which is a flexible support made of textile, paper, polyvinyl chloride, polyester, polypropylene, polyamide, polyethylene, polyethylene terephthalate, polyurethane or non-woven fiberglass.

These coatings are particularly suitable for their use in the field of non-stick solutions.

The present invention thus also relates to a coated substrate capable of being obtained according to the method as defined above. As indicated above, the substrate may be a flexible support of textile, paper, polyvinyl chloride, polyester, polypropylene, polyamide, polyethylene, polyethylene terephthalate, polyurethane or non-woven glass fibers.

The coated substrates have a non-stick, water-repellent, character or enable improved surface properties such as slipperiness, stain resistance or softness.

Another object of the invention relates to the following compounds (2), (4), (5), (6), (7), (7bis), (9), (15), (16) and (17):

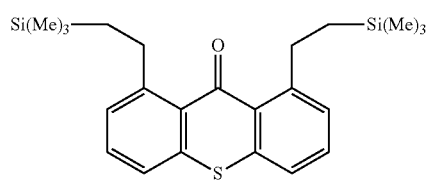

(2)

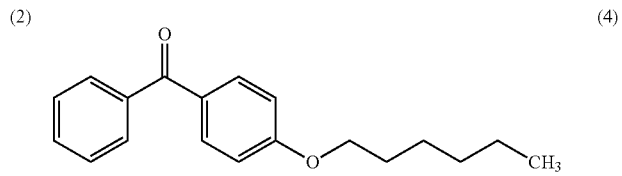

(4)

-continued

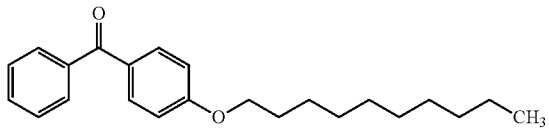
(5)

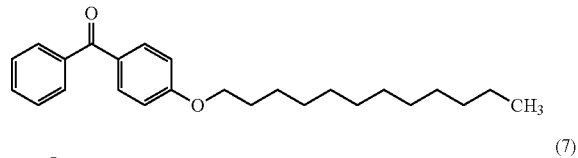
(6)

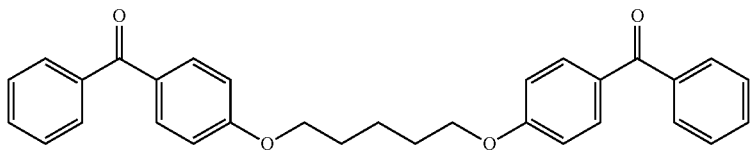
(7)

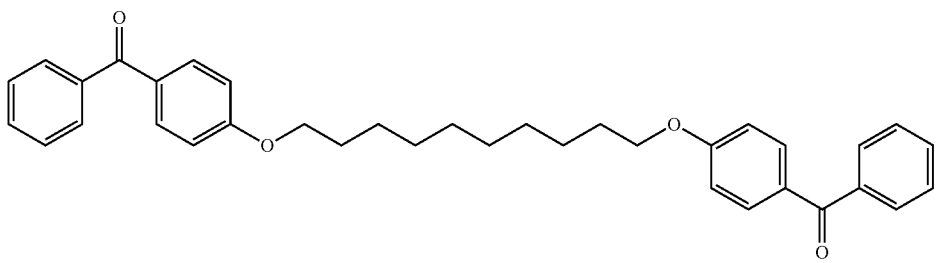
(7bis)

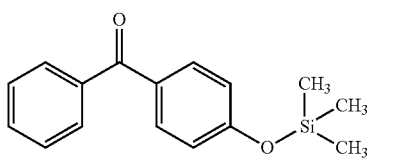 [SMILES: C[Si](C)(C)Oc1ccc(C(=O)c2ccccc2)cc1]
(9)

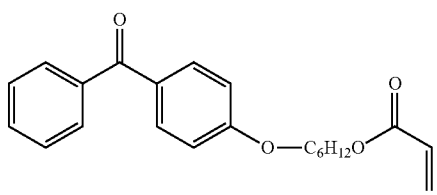
(15)

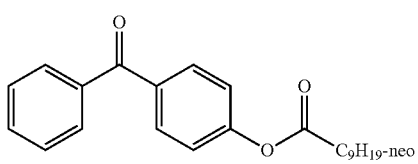
(16)

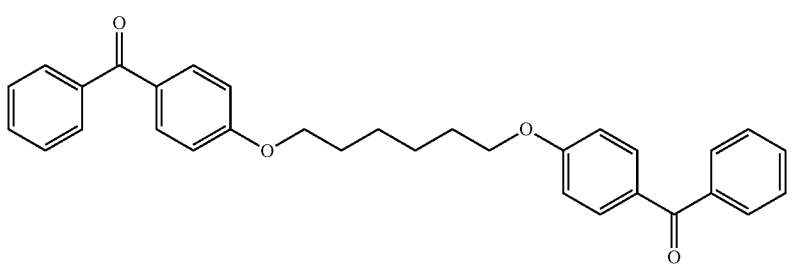 [SMILES: O=C(c1ccccc1)c1ccc(OCCCCCCOc2ccc(C(=O)c3ccccc3)cc2)cc1]
(17)

The invention also relates to the use of the compounds (2), (4), (5), (6), (7), (7bis), (9), (15), (16) and (17) described above as radical photoinitiators, and preferably the use of compounds (2), (4), (5), (6), (7), (7bis), (9), (15), (16) and (17) described above, as radical photoinitiators for the crosslinking of silicone compositions.

The examples below are given for illustrative non-limiting purposes. They allow, in particular, a better understanding of the invention and bring out all its advantages.

EXAMPLES

In the examples below, various photoinitiators, co-initiators and acrylic silicones were used according to the invention, while their structures are indicated in the tables below.

| Name | Molecular mass (g · mol⁻¹) | Structure |
| --- | --- | --- |
| Benzophenone (BP) from Rahn | 182 | |
| Genocure ® LBP from RAHN (LBP) Genopol ® BP-2 from RAHN (BP-2) | 188.74 | Mixture of benzophenone and 4-methylbenzophenone Polymeric Benzophenone |
| Isopropylthioxanthone (ITX) | 254.35 | |
| BP—OH compound (3) | 198 | |
| BP—OMe compound (8) | 212 | |
| BP-OHexa compound (4) | 292 | |
| BP—OTMeSi compound (9) | 270 | |
| X—TMVSi compound (2) | 384 | |
| BP-Acrylate (Fluorochem) | 252 | |

| Name | Molecular mass (g · mol$^{-1}$) | Structure |
|---|---|---|
| BP-OHexa-Acrylate compound (15) | 352 | |
| BP—O—CO-Néodéca compound (16) | 366 | |
| BP—OC$_6$H$_{12}$O—BP compound (17) | 466 | |

Among these photoinitiators, the compounds (2), (4), (8), (9), (15), (16) and (17) were synthesized according to the protocols explained below.

Synthesis of the Compound (4)

40.4 mmol (6.67 g) of bromohexane and 20.2 mmol (2.79 g) of potassium carbonate are introduced into a 100 ml two-neck flask in 10 ml of acetonitrile. The solution is then brought to the boil before adding dropwise a solution of 10.1 mmol (2 g) of 4-hydroxybenzophenone in 30 ml of acetonitrile. The solution passes from colorless to yellow. The reaction is complete when the solution is again colorless.

When the reaction is complete, the mixture is filtered through Celite™, and the filtrate is concentrated on a rotary evaporator.

The product is then purified on a silica column with a 90/10 cyclohexane/ethyl acetate eluent. The product is left under vacuum for 2 days to remove traces of bromohexane.

The product obtained is a white crystalline solid with a yield of 70.7%

Synthesis of Compounds (5,) (6), (7), (7bis), and (8)

The solid hydroxide hydroxide (4 equivalents per hydroxyl function) is added to anhydrous dimethylsulfoxide (DMSO) (2 mL per mmol of hydroxyl function). After stirring for 5 minutes, 5 mmol of 4-hydroxybenzophenone and the different halogenated compound for each compound (2 equivalents per hydroxyl function) are added dropwise to the reaction mixture. The mixture is then left overnight at ambient temperature with stirring and under argon. The mixture then has 20 ml of water added and is extracted three times with dichloromethane (20 ml per extraction). The organic phases are then washed five times with water (10 ml per wash). The organic phase is dried over MgSO$_4$. The solvent is then evaporated on a rotary evaporator and then under a vane-type pump vacuum.

the compound (5) was obtained from 4-hydroxybenzophen-one and bromodecane, with a yield of 89%;

the compound (6) was obtained from 4-hydroxybenzophen-one and bromododecane, with a yield of 71%;

the compound (7) was obtained from 4-hydroxybenzophen-one and 1,5-dibromopentane, with a yield of 63%; and the compound (7bis) was obtained from 4-hydroxybenzophen one and 1,10-dibromodecane, with a yield of 40%.

the compound (8) was obtained from 5 mmol of 4-hydroxybenzophenone and bromomethane with a yield of 67%.

Synthesis of the Compound (9)

0.25 mmol of diethyletherate of magnesium bromide is added to a mixture of 5 mmol of alcohol and 3 mmol of hexamethyldisilazane. The reaction mixture is stirred for 4 hours at ambient temperature.

The reaction medium has 10 ml of water added and is extracted three times with diethyl ether (10 ml by extraction). The combined ethereal phases are then washed with water and then dried over MgSO$_4$. The solvent is evaporated on a rotary evaporator and then vane-type pump vacuum.

This compound was obtained with a yield of 20% from 5 mmol of 4-hydroxybenzophenone.

Synthesis of the Compound (2)

0.1 mmol of the ruthenium catalyst (RuH$_2$(CO)(P(C$_6$H$_5$)$_3$)$_3$) is added to 10 ml of toluene. The reaction mixture is stirred for 15 min (the time to activate the catalyst and for the color of the solution to become red) at 135° C. under an inert atmosphere of Ar in a reflux setup. 5 mmol of thioxanthone and 10 mmol of trimethylvinylsilane are added to the reaction medium. The reaction mixture is kept stirring for 72 h at 135° C. under Ar. The compound (2) is recovered and purified by chroma-tography on a silica column (9: 1 cyclohexane/ethyl acetate eluent). The yield is greater than 90%.

Synthesis of the Compound (15)

The compound (15), BP-OHexa-Acrylate, is synthesized in two steps as described below.

Step 1: Synthesis of Br-Hexa-Acrylate

In a 100 ml two-neck flask containing 12 ml of $CH_2Cl_2$, add at 0° C., 16.57 mmol of 6-bromohexan-1-ol with 24.85 mmol of triethylamine and a catalytic amount of DMAP (4-(dimethylamino)pyridine). In a dropping funnel, add 18.22 mmol of acrylate chloride with 2 mL of dichloromethane. This latter mixture is added dropwise to the solution prepared in the flask. The whole is left to react for a week.

Once the reaction is complete, the reaction mixture is extracted with $CH_2Cl_2$ and then washed with 1N of HCl, water and brine before being dried over anhydrous magnesium sulfate. The organic phase is then concentrated on a rotary evaporator. The product obtained is then purified by column of silica with a 90/10 cyclohexane ether eluent. The yield is 65%.

Reaction:

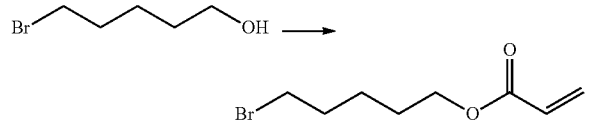

Step 2: Synthesis of BP-O Hexa Acrylate

Procedure:

In a 100 mL single-neck flask, introduce 8.26 mmol of 4-hydroxybenzophenone in 30 mL of acetone with 12 mmol of pure $K_2CO_3$. To the mixture, 8.20 mmol of Br-Hex-acrylate (step 1) are added with stirring. The mixture is brought to 60° C. with stirring for 24 hours.

When the reaction is complete, the acetone is evaporated and the reaction mixture is washed twice with 30 mL of 2N HCl solution, then twice with 30 mL of a 1N solution of sodium bicarbonate and twice 30 mL of water. The organic phase is then dried over magnesium sulphate and then evaporated. The product obtained is then purified by column of silica with a 90/10 cyclohexane ether eluent. The yield of compound (15) BP-O Hexa-Acrylate is 25%.

Synthesis of the Compound (16)
(BP—O-CO-Neodeca)

To a solution at 0° C. containing 15 mmol (3 g) of 4-hydroxy-benzophenone, 22.5 mmol (4.29 g) of neodecanoic acid chloride in 12 mL of anhydrous dichloromethane, 22.5 mmol (2.27 g) triethylamine is added a catalytic amount of DMAP and allowed to react at ambient temperature with stirring for 1 night. Once the reaction is complete, the reaction medium is diluted in 20 ml of diethyl ether, and the organic phase is washed successively with a 2N solution of HCl, water, and brine before being dried over anhydrous magnesium sulfate. The organic phase is then concentrated on a rotary evaporator. The product obtained is then purified by column of silica with a 90/10 cyclohexane ether eluent. The yield obtained is 66%.

Synthesis of the Compound (17)
(BP-OC$_6$H$_{12}$O-BP)

In a 100 mL one-neck flask, add 24.6 mmol (4.766 g) of 4-hydroxybenzophenone in 50 mL of DMSO and then introduce 98.4 mmol (5.520 g) of potassium hydroxide. 8.20 mmol (2 g) of 1,6-dibromohexane is then introduced dropwise with stirring and under argon. The reaction is allowed to react for 6 days.

When the reaction is complete, 100 ml of water are introduced. The reaction mixture is then extracted with 3 times 40 ml of dichloro-methane and then washed with water. The organic phase is then dried over sodium sulfate before being evaporated.

The product obtained is then dried under a vane type pump vacuum for 2 days to give the pure product. It is a crystalline white solid. The yield obtained is 94%.

Co-initiators (Table 2)

TABLE 2

Co-initiators

| Compound | Name/Supplier | Si—H unit position | Si—H content mol/ (100 g) |
|---|---|---|---|
| S1 | Tris(trimethylsilyl)silane (TTMSS) | — | 0.402 |
| S2 | Triphenylsilane (TPSi) | — | 0.384 |
| S3 | Octadecylsilane (OctaSi) | — | 1.054 |
| H1 | PMHSi oil from ABCR (AB 112087) (CAS: 63148-57-23) | Chain middle | 1.41 |
| H2 | Bluesil ® 620V20 | Chain end | 0.114 |
| H3 | Bluesil ® WR 68 | Chain middle | 1.530 |
| H4 | Bluesil ® 628V12H3, 5 | Chain middle | 0.362 |
| H5 | ALKASIL MR-1667 oil | Chain middle | 0.0228 |
| H6 | Bluestar Silicones— hydrogenated organopolysiloxane | Chain middle | 1.097 |
| H7 | Bluestar Silicones— hydrogenated organopolysiloxane | Chain middle | 1.466 |
| H8 | Bluestar Silicones— hydrogenated organopolysiloxane | Chain middle and end | 0.0646 |
| H9 | Bluesil ® 626V30H2, 5 | Chain middle and end | 0.252 |
| H10 | Bluestar Silicones— hydrogenated organopolysiloxane | Chain middle and end | 0.690 |
| H11 | Bluesil ® Resin 10339 | M'4Q resin | 0.900 |

The compounds S1, S2 and S3 are silanes.

The compounds H1 to H10 are linear methylhydrogensiloxanes wherein the Si—H functions may be in the silicone chain, at the end of the silicone chain (end of the chains) or both.

The compound H11 is a resin comprising siloxyl units "Q" of formula $SiO_{4/2}$ and siloxyl units "M" of formula $H(CH_3)_2SiO_{1/2}$.

Acrylic Silicones (Table 3)

The acrylic silicones used A1 and A2 have the above-mentioned formula (III) in which:

The following table (Table 4) expresses mixtures made on a basis of 2 g of A1 or A2 resin. The data are expressed in % weight. Thie procedure was carried out under lamination.

| Compound | $R^1$ | $R^2$ | $R^3$ | a | b | d | c |
|---|---|---|---|---|---|---|---|
| A1 | $CH_3$ | $-(CH_2)_3-O-CH_2-\overset{OH}{\underset{\|}{CH}}-CH_2-O-\overset{O}{\underset{\|}{C}}-CH=CH_2$ | $CH_3$ | 85 | 7 | 0 | 0 |
| A2 | $CH_3$ | $-(CH_2)_3-O-CH_2-\overset{OH}{\underset{\|}{CH}}-CH_2-O-\overset{O}{\underset{\|}{C}}-CH=CH_2$ | $CH_3$ | 220 | 4 | 0 | 0 |

Example 1: Monitoring the Polymerization of Acrylic Silicone Acrylic Functions

This example relates to the use of the H3 oil (see Table 2 above) as a co-initiator in combination with the benzophenone photoinitiator in order to initiate the polymerization of acrylic silicones (A1 and A2, described in Table 3 above).

Moreover, for the comparative tests, a type I photoinitiator was also used, i.e. Irgacure® 1173 (CAS #: 7473-98-5) with the following structure:

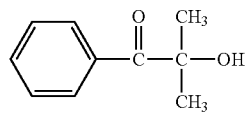

The preparations are obtained as follows: The benzophenone was weighed and introduced into the A1 or A2 resin, and the mixture was stirred until a homogeneous product was obtained (~30 minutes).

Finally, after weighing, organohydrogenpolysiloxane H3 was introduced.

The preparations thus obtained were then crosslinked under UV radiation with a Mercure-Xenon lamp with a reflector at 365 nm. The power of the UV lamp was set at 510 mW·cm$^{-2}$.

The procedure was carried out under air or laminated in order to overcome any inhibitive action of the reactive species by the oxygen. When the procedure is carried out laminated, the formulation is placed between two sheets of polypropylene, then between two pellets of $CaF_2$.

The monitoring of the polymerization kinetics is carried out by Real-Time Fourier Transform Infra-Red (RT-FTIR, Vertex 70 from Brucker Optik). This spectroscopic technique consists of exposing the sample simultaneously to light and an infra-red ray in order to follow the changes in the IR spectrum at 1636 cm$^{-1}$, which is a characteristic band of the C=C bond of the acrylic functions.

The conversion rate of C=C to C—C during the polymerization is directly related to the decrease in the area under the peak calculated at 1636 cm$^{-1}$ according to the following equation: conversion (%)=(A0−At)/A0×100 wherein A0 is the area under the peak before irradiation while At is the area under the peak at each instant t of irradiation.

Plotting against time allows access to the final conversion rate, but also to other important parameters, such as the maximum conversion rate ((Rp/[M]0)×100). The latter is determined by the slope of the curve Conversion (%)=f(t) at its point of inflection Demonstration of the Priming Efficiency of the Type II System on Acrylic Silicones A1 and A2 Under Lamination.

TABLE 4

| | A1 | | | | | A2 | | | | |
|---|---|---|---|---|---|---|---|---|---|---|
| | 1C | 2C | 3C | 4C | 5 (inv.) | 6C | 7C | 8C | 9C | 10 (inv.) |
| Irgacure® 1173 | — | 1% | — | — | — | — | 1% | — | — | — |
| BP | — | — | 1% | — | 1% | — | — | 1% | — | 1% |
| H3 | — | — | — | 1% | 1% | — | — | — | 1% | 1% |
| Rp/[M]0 × 100 | NA | 82 | 7.3 | 1.9 | 52.6 | NA | 160 | 4.3 | 0.7 | 61.5 |
| Conversion (%) | 12 | 99 | 36 | 16 | 98 | 9 | 99 | 27 | 14 | 93 |

The examples denoted C correspond to comparative examples, while the other examples (5 and 10) correspond to compositions according to the invention.

These tests clearly show that the photoinitiator (benzophenone) or the co-initiator (H3) are not effective separately as polymerization initiators (tests 3C & 4C and tests 8C & 9C).

On the other hand, the combination of the two elements to constitute the type II photoinitiator system according to the invention is effective (test 5 vs 3C & 4C and test 10 vs 8C & 9C).

The conversions obtained are quite convincing in comparison with the type I photoinitiator Irgacure® 1173 (test 5 vs 2C and test 10 vs 7C).

Demonstration of the Priming Efficiency of the Type II System on Acrylic Silicones A1 and A2 in Air.

The following table (Table 5) expresses mixtures made on a 2 g basis of A1 or A2 resin. The data are expressed in % weight. These procedures were performed under air.

TABLE 5

| | A1 | | A2 | |
|---|---|---|---|---|
| | 11C | 12 (inv.) | 13C | 14 (inv.) |
| Irgacure® 1173 | 1% | — | 1% | — |
| BP | — | 1% | — | 1% |
| H3 | — | 1% | — | 1% |
| Rp/[M]0 × 100 | 75 | 44.6 | 148 | 44.5 |
| Conversion (%) | 92 | 79 | 95 | 94 |

The examples denoted C correspond to comparative examples while Examples 12 and 14 correspond to compositions according to the invention.

These tests demonstrate that the type II photoinitiator system according to the invention also allows efficient polymerization under air compared to the type I system that is known as being more robust (test 11C vs 12 and 13C test vs 14).

Example 2: Use of Other Photoinitiators

Example 1 is reproduced by replacing the benzophenone with a benzophenone derivative or an isopropylthioxanthone derivative.

The co-initiator is H1 oil (see Table 2).

The tests were carried out using $1.2 \times 10^{-4}$ moles of photoinitiator and $8.05 \times 10^{-5}$ moles of —Si—H bonds. As in Example 1, 2 g of acrylic silicone (A1) were used.

The photoinitiators tested are BP-OH, BP-OMe, BP-OHexa, BP-OTMeSi, TX-TMVSi, BP-Acrylate, BP-OHexa-Acrylate, BP-O-CO-Neodeca and BP-O-C6H12-O-BP whose structures are described in Table 1.

The results obtained are shown in Table 6 below.

TABLE 6

| Photoinitiator | $Rp/[M]_0 \times 100$ | Conv. (%) |
|---|---|---|
| BP-OH | 5.7 | 90 |
| BP-OMe | 2.8 | 91.8 |
| BP-OHexa | 9.5 | 92 |
| BP-OTMeSi | 7.6 | 94 |
| TX-TMVSi | 1.8 | 55 |
| BP-Acrylate | 24 | 86 |
| BP-OHexa-Acrylate | 52 | 89 |
| BP-O—CO-Neodeca | 45 | 94 |
| BP-O—$C_6H_{12}$—O-BP | 15.5 | 77.2 |

It has therefore been found that the photoinitiators tested, other than benzophenone, also allow, in combination with an organo-hydrogenpolysiloxane, the polymerization of the acrylic silicones tested.

Example 3: Use of Other Silane Co-Initiators

Polymerization tests were carried out under the same conditions as those of Example 1, while modifying the nature of the co-initiator. In this example, the organohydrogenpolysiloxane oil was replaced by a silane selected from S1, S2 or S3 described in Table 2.

The photoinitiator used is benzophenone (BP), as in Example 1, or isopropylthioxanthone (ITX).

The tests were carried out using $1.2 \times 10^{-4}$ moles of co-initiator and $8.05 \times 10^{-5}$ moles of —Si—H bonds under lamination.

As in Example 1, 2 g of acrylic silicone (A1 or A2) were used.

The results obtained are shown in Tables 7 and 8 below:

TABLE 7

| | With benzophenone | | | |
|---|---|---|---|---|
| | A1 | | A2 | |
| | $Rp/[M]_0 \times 100$ | Conv. (%) | $Rp/[M]_0 \times 100$ | Conv. (%) |
| S1 | 47 | 99 | 50.7 | 99 |
| S2 | 62.4 | 99 | 55.1 | 99 |
| S3 | 59.8 | 99 | 59.2 | 99 |

TABLE 8

| | With ITX | |
|---|---|---|
| | A1 | |
| | $Rp/[M]_0 \times 100$ | Conv. (%) |
| S1 | 4.8 | 91.5 |
| S2 | 6.1 | 93.7 |
| S3 | 3.1 | 90.2 |

It has thus been found that the silanes tested also allow, in combination with benzophenone or with isoproprylthioxanthone, the polymerization of the acrylic silicones tested.

In the following examples, silicone compositions according to the invention were coated and then crosslinked by exposure to radiation on flexible supports. The non-stick performance of the supports thus obtained was evaluated. To do this, the formulations are prepared by mixing the various components described in Examples 5 to 9, and then coated with a Rotomec pilot coating on different supports under the conditions described in the various examples.

Tests Carried Out on Substrates Coated with Silicone Non-Stick Coatings

Deposition: Control of the silicone deposit coated on the surface by X-ray fluorescence analysis of silicon (Oxford Lab-X 3000). An X-ray tube excites the electronic layer of the silicon atoms, which causes an X-ray emission proportional to the amount of excited silicon. This value or number of passes is transformed by calculation (using the calibration line) in amount of silicone.

Smear: Qualitative control of surface polymerization by the fingerprint method as follows:
  Place the silicone coated test sample to be tested on a flat, rigid surface;
  Make a trace with the fingertip by pressing moderately but clearly; and
  Examine with the eye the trace thus made, preferably in low-angled light. We can see the presence of a trace (even very slight) by the difference in gloss of the surface.

The appreciation is qualitative. The "smear" is quantified with the following rating:
  A: very good, no trace of the finger
  B: a little worse, barely visible trace
  C: clear trace
  D: very clear trace and oily appearance of the surface, barely polymerized,
  i.e. rating from A to D, from best result to worst result.

Rub-off: Check the ability of the silicone to adhere to the flexible support by rubbing the finger back and forth as follows:
  Place the silicone coated test sample to be tested on a flat and rigid surface, wherein the silicone is on the upper face;
  Perform 10 movements back and forth with the fingertip (of about 10 cm length) while pressing moderately but clearly;
  Examine the appearance of rubbings. The rubbings give the appearance of a fine white powder or small balls that roll under the finger.

The appreciation is qualitative.

The rubbings are quantified with the following rating:
  10: very good, no appearance of rubbings after 10 A-R
  1: very bad, rubbings from the first pass The rating reflects the number of back and forth movements (from 1 to 10) after which a rubbings appear.

I.e., a score of 1 to 10, from the lowest to the best result.

Dewetting: Assessment of the degree of polymerization of the silicone layer by evaluating the transfer of silicone to an adhesive brought into contact with the coating using a standard surface tensioning ink. The method is as follows:

Select a sample of about 20×5 cm of the silicone-coated paper to be tested, taken in the direction of unwinding (machine direction);

Cut a length of ≈15 cm of adhesive tape, then place it with the adhesive side on the paper to be tested, without creases, and exert a pressure 10 times by sliding the finger along the length of the adhesive tape. (3M Scotch tape, reference 610, width: 25 mm);

Remove the adhesive tape and lay it flat, adhesive side up;

Place on the adhesive side of the ribbon, with a cotton swab (for single use), a trace of ink about 10 cm long (SHERMAN or FERARINI and BENELI brand inks of surface tension ≈30 dynes/cm and viscosity 2 to 4 mPa/s). Immediately trigger the stopwatch;

We consider that the phase of the dewetting phenomenon begins when the ink stroke changes appearance; then stop the timer;

The removal of the ink from the adhesive side of the tape must be effected within 2 minutes after the silicone coating;

If the result obtained is <10 seconds, it is estimated that there is silicone migration on the adhesive, and that the polymerization is not complete;

A rating of 0 to 10 is given corresponding to the time elapsed in seconds before the observation of the dewetting phenomenon;

If the result obtained is 10 seconds, it is estimated that the polymerization is complete. In this case, a score of 10 is given meaning that the result is very good;

Note the rating obtained and the ink used (name, brand, surface tension, viscosity).

Extractibles:

Measurement of the amount of silicone that is not grafted to the network formed during the polymerization. These silicones are extracted from the film by immersion of the sample from the machine exit in the MIBK for a minimum of 24 hours. This is measured by flame absorption spectroscopy.

Preparation of Self-Adhesive Multilayer Articles

A standardized adhesive-coated support TESA7475 (support=PET–adhesive=acrylic) is complexed on the silicone liner produced above (=support coated with a silicone coating obtained by crosslinking under UV) in order to form a multilayer article. Traction tests are carried out to determine the peel forces before and after aging as well as the subsequent adhesion and loop-tack values. These tests are described below.

Test Performed on Multilayer Articles Obtained

Subsequent Adhesion (or "SubAd"):

Measurement of the retention of adhesive (TESA 7475) that has been in contact with the silicone coating in accordance with the FINAT 11 (FTM 11) test known to those skilled in the art. In this test, the reference specimen is PET and the adhesives remain in contact with the silicone surface to be tested for 1 day at 70° C. and for 7 days at 70° C.

The results are expressed in % adhesive strength retention of the reference tape: $CA=(Fm2/Fm1)\times100$ in % wherein:

Fm2=average tape non-stick forces after contact with silicone support for 20 h; and Fm1=Average (non-contact) tape non-stick forces with silicone support.

Loop-tack: The loop-tack test consists in determining the force required to separate, at 300 mm/min, a loop of adhesive (TESA 7475) placed in contact with a standard material without pressure. The ratio of the result between a clean adhesive and a complexed adhesive for 1 day at 23° C. makes it possible to assess the loss of adhesiveness according to the FINAT 9 test (FTM9) known to those skilled in the art.

The final result will be the average of the three measurements expressed in N/inch (unit: 1 inch=2.54 cm).

Non-stick: The measurements of the peel forces were carried out with the standardized adhesive TESA 7475. The specimens of the multilayer article (adhesive in contact with silicone surface) were kept for 1 day at 23° C., 1 day at 70° C. and 7 days at 70° C. under the required pressure conditions, then tested at low peel rate according to the FINAT 3 (FTM3) test that is known to those skilled in the art.

The peel force is expressed in cN/inch and is measured with a dynamometer after pressurizing the samples either at ambient temperature (23° C.) or at a higher temperature for accelerated aging tests (in general 70° C.).

Example 4

In this example, benzophenone was used as the photoinitiator and, as a co-initiator, compound H9 (see Table 2). The various formulations are described in Table 11 below. A type I photoinitiator system, i.e. ethyl(1,4,6-triethylbenzoyl)phenylphosphinate (PA I) was also tested.

Coating conditions:

Line speed: 50 m/min—UV lamp: Hönle at 100 W/cm

Corona: 1000 W—residual 02 under lamp: <20 ppm

The coating support is LDPE of 87 g/m². The coating is carried out on the out face of the support. The target deposit is between 0.8 and 1.0 g/m².

At the machine output, the results of the tests carried out are presented in the following table 9:

TABLE 9

| Composition | Comp. PA type I | Invention Ex A1 | Invention Ex A2 | Invention Ex A3 |
|---|---|---|---|---|
| A1 (g) | 99 | 99 | 99 | 99 |
| PA I (g) | 1 | | | |
| BP (g) | | 1 | 1 | 1 |
| H9 (g) | | 0.5 | 1 | 5 |
| BP (mol/100 g composition) | | 0.0055 | 0.0054 | 0.0052 |
| SiH (mol/100 g composition) | | 0.0013 | 0.0025 | 0.0120 |
| Ratio mol BP/SiH | | 4.4 | 2.2 | 0.4 |
| Coating characterisation | | | | |
| Smear | A | A | A | A |
| Rub-off | 10 | 10 | 10 | 10 |
| Dewetting | 10 | 10 | 10 | 0 |
| Extractibles (100 cm2) dosage | 3.16 | 4.3 | 4.7 | 6.55 |
| Extractibles in line (100 cm2) % | 4.2 | 6.4 | 7.3 | 10.4 |
| Multilayer article TESA 7475 characterisation | | | | |
| Subadhesion 1 d@70° C. | 0.8 | 0.7 | 0.7 | 0.6 |
| Subadhesion 1 d@70° C. (%) | 71 | 65 | 64 | 60 |

TABLE 9-continued

| Composition | Comp. PA type I | Invention Ex A1 | Invention Ex A2 | Invention Ex A3 |
|---|---|---|---|---|
| Subadhesion 7 d@70° C. | 0.72 | 0.75 | 0.72 | 0.71 |
| Subadhesion 7 d@70° C. (%) | 67 | 70 | 68 | 67 |
| Loop Tack (N) according to FINAT3 (1 d@23° C.) | 24 | 22.3 | 24.6 | 19.1 |
| Loop Tack (%) according to FINAT3 (1 d@23° C.) | 108 | 102 | 112 | 87 |
| Release TESA 7475 | | | | |
| 1 d@23° C. | 11.82 | 9.4 | 9 | 7.2 |
| 1 d@70° C. | 13.73 | 9.63 | 9.42 | 10.43 |
| 7 d@70° C. | 19.82 | 16.5 | 23.2 | 71.9 |

This example shows that, for type II photoinitiators, the best results are obtained with low concentrations of Si—H functions in the silicone composition (Examples A1 and A2) that are comparable to those obtained with a type I photoinitiator. Example A3, where the silicone composition comprises 0.012 mol Si—H/100 g leads to a high extractability rate, a poor performance in the dewetting test and a high non-stick property after 7 days at 70° C.

Example 5: Influence of the Photoinitiator and Co-Initiator Concentration

In this example, we varied the molar content of Si—H in the coating composition and the molar content of photoinitiator. For this, 3 molar concentrations of different Si—H functions were used (0.001-0.002 and 0.003 mol/100 g of silicone composition) and, for each, 4 molar concentrations of photoinitiator (0.0017-0.0033-0.0064 and 0.0129 mol/100 g of silicone composition), with the type I PA I photoinitiator system as a control. The photoinitiator used is $G_{enocure}$® LBP.

Coating conditions:
Line speed: 50 m/min—UV lamp: Mille at 200 W/cm—Corona: 1000 W—residual O2 under lamp: <20 ppm The coating support is LDPE of 23 g/m² while the coating is effected on the out face. The target deposit is between 0.8 and 1.0 g/m².

The following Table 10 summarizes the different silicone compositions used, as well as the results obtained in the above-mentioned tests.

TABLE 10

| Composition | Comp. PA type I | Invention Ex B1 | Invention Ex B2 | Invention Ex B3 | Invention Ex B4 | Invention Ex B5 | Invention Ex B6 |
|---|---|---|---|---|---|---|---|
| A1 (g) | 100.48 | 100.33 | 100 | 101.18 | 99.99 | 101.21 | 99.89 |
| PA I (g) | 0.98 | | | | | | |
| BP (g) | | 0.32 | 0.62 | 1.21 | 2.43 | 0.32 | 0.61 |
| H9 (g) | | 0.3 | 0.32 | 0.31 | 0.3 | 0.61 | 0.64 |
| BP (mol/100 g composition) | | 0.0017 | 0.0032 | 0.0062 | 0.0125 | 0.0017 | 0.0032 |
| SiH (mol/100 g composition) | | 0.001 | 0.001 | 0.001 | 0.001 | 0.002 | 0.002 |
| Ratio mol BP/SiH | | 2.2 | 4.1 | 8.2 | 17.0 | 1.1 | 2.0 |
| Coating characterisation | | | | | | | |
| Smear | A | A | A | A | A | A | A |
| Rub-off | 10 | 10 | 10 | 10 | 10 | 10 | 10 |
| Dewetting | 9 | 10 | 10 | 10 | 9 | 10 | 10 |
| Extractibles (100 cm2) dosage | 1.7 | 2.58 | 2.71 | 2.83 | 2.59 | 3.47 | 3.24 |
| Extractibles in line (100 cm2) % | 2.5 | 3.9 | 4.3 | 3.9 | 4.2 | 4.9 | 5.1 |
| Multilayer article TESA 7475 characterisation | | | | | | | |
| Subadhesion 1 d@70° C. | 0.78 | 0.77 | 0.77 | 0.74 | 0.76 | 0.78 | 0.77 |
| Subadhesion 1 d@70° C. (%) | 84 | 83 | 83 | 79 | 82 | 84 | 83 |
| Subadhesion 7 d@70° C. | 0.68 | 0.57 | 0.57 | 0.55 | 0.61 | 0.68 | 0.5 |
| Subadhesion 7 d@70° C. (%) | 92 | 78 | 77 | 74 | 83 | 93 | 68 |

TABLE 10-continued

| Release TESA 7475 | | | | | | | |
|---|---|---|---|---|---|---|---|
| 1 d@23° C. | 10.94 | 8.63 | 8.29 | 8.19 | 8.78 | 7.7 | 8.06 |
| 1 d@70° C. | 11.33 | 9.43 | 9.29 | 10.3 | 10.24 | 10.48 | 10.49 |
| 7 d@70° C. | 14.36 | 14.37 | 14.4 | 17.5 | 21.92 | 21.92 | 18.15 |

| Composition | Invention Ex B7 | Invention Ex B8 | Invention Ex B9 | Invention Ex B10 | Invention Ex B11 | Invention Ex B12 |
|---|---|---|---|---|---|---|
| A1 (g) | 100.59 | 99.48 | 100.59 | 100.78 | 100.34 | 99.86 |
| PA I (g) | | | | | | |
| BP (g) | 1.21 | 2.41 | 0.32 | 0.62 | 1.19 | 2.42 |
| H9 (g) | 0.62 | 0.62 | 1.26 | 1.23 | 1.26 | 1.24 |
| BP (mol/100 g composition) | 0.0063 | 0.0124 | 0.0016 | 0.0032 | 0.0061 | 0.0124 |
| SiH (mol/100 g composition) | 0.002 | 0.002 | 0.003 | 0.003 | 0.003 | 0.003 |
| Ratio mol BP/SiH | 4.1 | 8.2 | 0.5 | 1.1 | 120 | 4.1 |
| Coating characterisation | | | | | | |
| Smear | B | A | B | A | B | A |
| Rub-off | 10 | 10 | 10 | 10 | 10 | 10 |
| Dewetting | 8 | 10 | 9 | 10 | 9 | 9 |
| Extractibles (100 cm2) dosage | 3.18 | 2.71 | 3.61 | 3.46 | 3.52 | 3.09 |
| Extractibles in line (100 cm2) % | 4.7 | 4.2 | 5.3 | 5.3 | 5.1 | 4.9 |
| Multilayer article TESA 7475 characterisation | | | | | | |
| Subadhesion 1 d@70° C. | 0.79 | 0.57 | 0.72 | 0.75 | 0.69 | 0.72 |
| Subadhesion 1 d@70° C. (%) | 85 | 62 | 78 | 81 | 75 | 77 |
| Subadhesion 7 d@70° C. | 0.6 | 0.57 | 0.65 | 0.48 | 0.55 | 0.56 |
| Subadhesion 7 d@70° C. (%) | 81 | 78 | 88 | 65 | 75 | 76 |
| Release TESA 7475 | | | | | | |
| 1 d@23° C. | 8.3 | 9.31 | 7.13 | 7.81 | 7.69 | 8.49 |
| 1 d@70° C. | 10.14 | 11.19 | 8.91 | 9.13 | 10.25 | 11.58 |
| 7 d@70° C. | 24.07 | 19.74 | 36.11 | 16.11 | 17.6 | 21.47 |

From Table 10 above, it was observed that, for all these tests, the results on the proficiency tests and the extractible measurements are satisfactory. It is found that with increasing concentration of Si—H functions in the composition, the extractable content increases. In particular, it has been found that it is particularly advantageous to use low concentrations of Si—H functions.

Example 6: Influence of the Si—H Function Content of the Co-Initiators

In this example, the tests were carried out at a constant concentration of Si—H functions in the starting composition, but organohydrogenpolysiloxane oils with a variable Si—H function content. Oils H4, H9, H8 and H5 were used (see Table 2). A constant concentration of Genocure® LBP photoinitiator was used.

These formulations were tested at low coating speed and high lamp power.

Coating conditions:

Line speed: 50 m/min—UV lamp: Hönle at 200 W/cm—Corona: 1000 W—residual O2 under lamp: <20 ppm The coating support is LDPE of 23 g/m². The coating is carried out on its out face. The target deposit is between 0.8 and 1.0 g/m² (0.90±0.10).

The following table 11 summarizes the compositions used and the results obtained following the tests mentioned above.

TABLE 11

| Composition | Comp. PA type I | Invention Ex C1 | Invention Ex C2 | Invention Ex C3 | Invention Ex C4 |
|---|---|---|---|---|---|
| A1 (g) | 100.09 | 100.33 | 100 | 101.18 | 99.99 |
| PA I (g) | 1.07 | | | | |
| LBP (g) | | 1.18 | 1.2 | 1.21 | 1.23 |
| H4 (g) | | 0.34 | | | |
| H9 (g) | | | 0.52 | | |
| H8 (g) | | | | 1.95 | |
| H5 (g) | | | | | 5.53 |
| BP (mol/100 g composition) | | 0.0061 | 0.0062 | 0.0061 | 0.0061 |

TABLE 11-continued

| Composition | Comp. PA type I | Invention Ex C1 | Invention Ex C2 | Invention Ex C3 | Invention Ex C4 |
|---|---|---|---|---|---|
| SiH (mol/100 g composition) | | 0.0012 | 0.0013 | 0.0012 | 0.0012 |
| Ratio mol BP/SiH | | 5.1 | 4.8 | 5.1 | 5.2 |
| Coating characterisation | | | | | |
| Smear | B | A | A | A-B | A |
| Rub-off | 9 | 9 | 9 | 9 | 10 |
| Dewetting | 10 | 10 | 10 | 10 | 2 |
| Extractibles (100 cm2) dosage | 2.72 | 3.13 | 2.99 | 3.89 | 4.75 |
| Extractibles in line (100 cm2) % | 3.9 | 4.4 | 4.6 | 5.7 | 6.7 |
| Multilayer article TESA 7475 characterisation | | | | | |
| Subadhesion 1 d@70° C. | 0.73 | 0.74 | 0.68 | 0.71 | |
| Subadhesion 1 d@70° C. (%) | 76 | 77 | 70 | 74 | 56 |
| Subadhesion 7 d@70° C. | | | | | 0.55 |
| Subadhesion 7 d@70° C. (%) | 90 | 83 | 87 | 78 | 58 |
| Loop Tack (N) according to FINAT3 (1 d@23° C.) | 25.2 | 24.8 | 20.7 | 19.5 | 12.9 |
| Loop Tack (%) according to FINAT3 (1 d@23° C.) | 88 | 87 | 73 | 68 | 45 |
| Release TESA 7475 | | | | | |
| 1 d@23° C. | 10.23 | 9.17 | 8.06 | 7.43 | 7.05 |
| 1 d@70° C. | 12.22 | 11.76 | 11.97 | 27.47 | 9.98 |
| 7 d@70° C. | 15.53 | 16.18 | 24.77 | 96.6 | 15.72 |

It is observed that the dewetting is degraded with the oil H5 (Ex C4) which has the lowest content of Si—H functions (0.0228 mol/100 g).

The H8 (Ex C3) oil with a Si—H function content of 0.0646 mol/100 g has a level of extractables 24% higher than those obtained with the co-initiators H4 and H9 (Ex C1 and C2), while non-stick values increase sharply after 1 and 7 days at 70° C.

This example therefore shows that it is preferable to use as co-initiator an organohydrogenpolysiloxane comprising at least 0.05 mole of Si—H functions per 100 g, and preferably at least 0.08 mole of Si—H functions per 100 g.

Example 7: Coating Tests with Different Oils According to the Content of Si—H Functions and the Position of Si—H Units This example concerns the study of the impact on polymerization of the nature of the co-initiators and, in particular, the position of the Si—H units (end of chain, in the chain, or both).

Coating conditions:
Line speed: 50 m/min—UV lamp: Hönle at 200 W/cm—Corona: 1000 W—residual 02 under lamp: <20 ppm The coating support is white LDPE GLD3 28 g/m². The coating is carried out on its out face. The target deposit is between 0.8 g/m² and 1.0 g/m².

As a photoinitiator, Genocure® LBP was used (Table 1). The co-initiator is selected from different oils or resins with different structures and content of Si—H functions (see Table 2).

The following Table 12 summarizes the different compositions used as well as the results obtained following the aforementioned tests.

TABLE 12

| Composition | Comp. PA type I | Invention Ex D1 | Invention Ex D2 | Invention Ex D3 | Invention Ex D4 | Invention Ex D5 | Invention Ex D6 | Invention Ex D7 | Invention Ex D8 |
|---|---|---|---|---|---|---|---|---|---|
| A1 (g) | 100.07 | 100.02 | 100.09 | 100.16 | 100 | 100.08 | 100.02 | 100.12 | 100.18 |
| PA I (g) | 1.002 | | | | | | | | |
| LBP (g) | | 0.47 | 0.48 | 0.47 | 0.47 | 0.46 | 0.49 | 0.46 | 0.48 |
| H2 (g) | | 0.691 | | | | | | | |
| H9 (g) | | | 0.325 | | | | | | |
| H10 (g) | | | | 0.125 | | | | | |
| H4 (g) | | | | | 0.231 | | | | |
| H6 (g) | | | | | | 0.077 | | | |
| H3 (g) | | | | | | | 0.057 | | |
| H7 (g) | | | | | | | | 0.062 | |
| H11 (g) | | | | | | | | | 0.091 |
| LBP (mol/100 g comp.) | | 0.0025 | 0.0025 | 0.0025 | 0.0025 | 0.0024 | 0.0026 | 0.0024 | 0.0025 |
| SiH (mol/100 g comp.) | | 0.0008 | 0.0008 | 0.0009 | 0.0008 | 0.0008 | 0.0009 | 0.0009 | 0.0008 |
| ratio mol LBP/SiH | | 3.2 | 3.1 | 2.9 | 3.0 | 2.9 | 3.0 | 2.7 | 3.1 |

TABLE 12-continued

| Composition | Comp. PA type I | Invention Ex D1 | Invention Ex D2 | Invention Ex D3 | Invention Ex D4 | Invention Ex D5 | Invention Ex D6 | Invention Ex D7 | Invention Ex D8 |
|---|---|---|---|---|---|---|---|---|---|
| Coating characterisation | | | | | | | | | |
| smear | A-B | A | A-B | A-B | A | A-B | A | A-B | A |
| rub-off | 9.5 | 9.5 | 9 | 9 | 10 | 10 | 10 | 9.5 | 10 |
| dewetting | 10 | 10 | 10 | 10 | 10 | 10 | 10 | 10 | 10 |
| Extractibles (100 cm$^2$) dosage | 0.95 | 1.71 | 2.08 | 1.82 | 1.87 | 1.91 | 2.02 | 1.87 | 2.03 |
| Extractibles in line (100 cm$^2$) % | 1.3 | 24 | 2.9 | 2.6 | 2.8 | 25 | 3 | 2.8 | 3.1 |

The smear is rated from A-B to A for the entire series. The rub-off is between 9 and 10. The dewetting is 10. The polymerization of the coated compositions is therefore good for all the formulations and is not significantly affected by the nature of the co-initiator used, nor by the positioning of the Si—H units in the chain. All extractible values are between 2.4% and 3.1%. This confirms the fact that the polymerization is good whatever the position of the Si—H units.

The results of the characterization of the multilayer article and the non-stick values are all satisfactory as well.

This example also confirms that very good results are obtained when the co-initiator has an Si—H content greater than or equal to 0.05 mol/100 g.

Example 8: Coating Tests with a Mixture of A1 and A2

In this example, a mixture of organopolysiloxanes functionalized acrylate was used. Genocure® LBP was used as a photoinitiator and the H9 oil as a co-initiator.

Coating conditions:
Line speed: 50 m/min—UV lamp: Hönle at 200 W/cm—Corona: 1000 W—residual 02 under lamp: <20 ppm The coating support is PET 30,01/30 Transparent 30 g/m$^2$ TORAY. The coating is carried out on its out face. The target deposit is between 0.8 g/m$^2$ and 1.0 g/m$^2$. The following Table 13 summarizes the different compositions used as well as the results obtained following the aforementioned tests.

TABLE 13

| Composition | Comp. PA type I | Comp. PA type I | Invention Ex E1 | Invention Ex E2 | Invention Ex E3 |
|---|---|---|---|---|---|
| A1 (g) | 100.06 | 95.097 | 100.16 | 95.101 | 89.992 |
| A2 (g) | | 5.096 | | 5.095 | 10.122 |

TABLE 13-continued

| Composition | Comp. PA type I | Comp. PA type I | Invention Ex E1 | Invention Ex E2 | Invention Ex E3 |
|---|---|---|---|---|---|
| PA I (g) | 1.04 | 1.06 | | | |
| LBP (g) | | | 0.47 | 0.43 | 0.43 |
| H9 (g) | | | 0.339 | 0.327 | 0.333 |
| BP (mol/100 g composition) | | | 0.0025 | 0.0023 | 0.0023 |
| SiH (mol/100 g composition) | | | 0.0009 | 0.0008 | 0.0008 |
| Ratio mol BP/SiH | | | 2.9 | 2.8 | 2.7 |
| Coating characterisation | | | | | |
| Smear | A-B | A | A | A | A |
| Rub-off | 9 | 10 | 10 | 10 | 10 |
| Dewetting | 10 | 10 | 10 | 10 | 9 |
| Extractibles (100 cm2) dosage | 0.76 | 0.99 | 1.37 | 1.58 | 2.06 |
| Extractibles in line (100 cm2) % | 1.1 | 1.5 | 2 | 2.4 | 3 |

Example 9

A new series of tests was carried out to test lower concentrations in the silicone photoinitiator and co-initiator compositions. Genocure® LBP and Genocure® LBP-2 were used as photoinitiators and H9 oil as a co-initiator.

Coating conditions:
Line speed: 50 m/min—UV lamp: Hönle at 100 W/cm—Corona: 1000 W—residual 02 under lamp: <20 ppm The coating support is LDPE. The coating is carried out on its out face. The target deposit is between 0.8 g/m$^2$ and 1.0 g/m$^2$.

The following table 14 summarizes the different compositions used as well as the results obtained following the aforementioned tests.

TABLE 14

| Composition | Comp. PA type I | Invention Ex F1 | Invention Ex F2 | Invention Ex F3 | Invention Ex F4 | Invention Ex F5 |
|---|---|---|---|---|---|---|
| A1 (g) | 100.3 | 100.2 | 100.0 | 100.2 | 100.3 | 100.3 |
| PA I (g) | 1 | | | | | |
| LBP (g) | | 0.34 | 0.6 | 0.15 | 0.34 | |
| BP-2 (g) | | | | | | 1.56 |
| H9 (g) | | 0.345 | 0.336 | 0.189 | 0.187 | 0.326 |
| PA II (mol/100 g composition) | | 0.0018 | 0.0031 | 0.0008 | 0.0018 | 0.0016 |
| SiH (mol/100 g composition) | | 0.0009 | 0.0008 | 0.0005 | 0.0005 | 0.0008 |
| ratio mol PAII/SiH | | 2.1 | 3.7 | 1.7 | 3.8 | 1.9 |

TABLE 14-continued

| Composition | Comp. PA type I | Invention Ex F1 | Invention Ex F2 | Invention Ex F3 | Invention Ex F4 | Invention Ex F5 |
|---|---|---|---|---|---|---|
| Coating characterisation | | | | | | |
| smear | A-B | A-B | B | A-B | A-B | A |
| rub-off | 10 | 10 | 10 | 10 | 10 | 10 |
| dewetting | 10 | 10 | 10 | 10 | 10 | 10 |
| Extractibles (100 cm²) dosage | 0.96 | 1.95 | 1.7 | 2.56 | 2.5 | 4.45 |
| Extractibles in line (100 cm²) % | 1.5 | 3 | 2.5 | 3.9 | 4 | 6.8 |
| Multilayer article TESA 7475 characterisation | | | | | | |
| Subadhesion 1 d@70° C. | 0.64 | 0.67 | 0.69 | 0.8 | 0.7 | 0.59 |
| Subadhesion 1 d@70° C.( %) | 81 | 85 | 87 | 101 | 88 | 75 |
| Subadhesion 7 d@70° C. | 0.63 | 0.61 | 0.57 | 0.63 | 0.65 | 0.6 |
| Subadhesion 7 d@70° C.( %) | 84 | 81 | 75 | 83 | 86 | 79 |
| Release TESA 7475 | | | | | | |
| 1 d@23° C. | 9.45 | 9.95 | 10.26 | 10.62 | 10.32 | 8.24 |
| 1 d@70° C. | 22.75 | 12.04 | 13.59 | 12.16 | 12.06 | 9.81 |
| 7 d@70° C. | 30.41 | 19.5 | 18.15 | 13.33 | 13.83 | 10.33 |

The results are satisfactory for all the compositions tested. The Ex F3 test that low concentrations photoinitiator (0.0008 mol/100 g of composition) and co-initiator (0.005 mol/100 g of composition) can achieve satisfactory results.

Example 10

In this example, modified benzophenones were used as photoinitiators and, as co-initiator, compound H9 (see Table 2). The different formulations are described in the following table. The benzophenone Genocure LBP and a type I photoinitiator system which is ethyl(1,4,6-triethylbenzoyl)phenylphosphinate (PA I) were also tested.

Since the coating was carried out in the absence of corona, a tack additive was added to all the formulations.

Coating conditions:
Line speed: 50 m/min—UV lamp: Hönle at 200 W/cm
residual 02 under lamp: <20 ppm
The coating support is glassine.
The coating is carried out on the out face of the support. The target deposit is between 0.8 and 1.0 g/m².

At the machine output, the results of the tests carried out are presented in the following Table 15:

TABLE 15

| Composition | Comp. PA Type I | Invention Ex. G1 | Invention Ex. G2 | Invention Ex. G3 |
|---|---|---|---|---|
| A1 (g) | 70 | 70 | 70 | 70 |
| Add. Accroche (g) | 30 | 30 | 30 | 30 |
| PA I (g) | 1 | | | |
| Genocure LBP (g) | | 0.34 | | |
| 4-Benzoylphenyl acrylate (g) | | | 0.40 | |
| Bzp-O-neo (g) | | | | 0.61 |
| H9 (g) | | 0.31 | 0.30 | 0.30 |
| mol PA II | N.A. | 0.0018 | 0.0016 | 0.0016 |
| mol SiH | N.A. | 0.0078 | 0.0078 | 0.0078 |
| ratio molaire PA II/SiH | N.A. | 2.2 | 2.2 | 2.2 |
| Coating characterisation | | | | |
| Smear | A | A | A | A |
| Rub-off | 10 | 10 | 10 | 10 |
| dewetting | 10 | 10 | 10 | 10 |
| Extractibles (100 cm²) dosage | 1.98 | 4.22 | 6.15 | 4.14 |
| Extractibles in line (100 cm²) % | 2.8 | 6.1 | 8.5 | 5.9 |

TABLE 15-continued

| Composition | Comp. PA Type I | Invention Ex. G1 | Invention Ex. G2 | Invention Ex. G3 |
|---|---|---|---|---|
| Multilayer article TESA 7475 characterisation | | | | |
| Subadhesion 1 d@70° C. (ref TESA 7475) | 0.68 | 0.60 | 0.57 | 0.58 |
| Subadhesion 1 d@70° C. (%) | 103 | 91 | 87 | 88 |
| Subadhesion 6 d@70° C. (ref TESA 7475) | 0.63 | 0.64 | 0.62 | 0.66 |
| Subadhesion 6 d@70° C. (%) | 80 | 82 | 79 | 84 |
| Release TESA 7475 | | | | |
| 1 d@23° C. | 9.98 | 9.77 | 8.93 | 8.26 |
| 1 d@70° C. | 14.46 | 14.04 | 12.87 | 12.51 |
| 6 d@70° C. | 25.07 | 24.41 | 22.02 | 15.30 |

What is claimed is:

1. A silicone composition C that is crosslinkable by exposure to radiation with a wavelength between 200 nm and 450 nm, comprises:

at least one radical photoinitiator A chosen among disubstituted benzophenones comprising 1 substitution on each aromatic ring and the compounds of formula (IV) below:

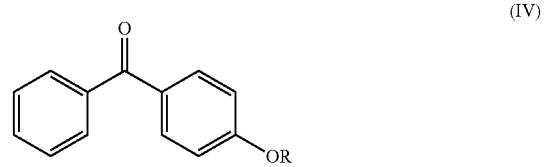

(IV)

wherein R is selected from among:

H;

Si(R¹)₃ groups, the R¹ groups, identical or different, are (C₁-C₆) alkyl groups; and $C_1$-$C_{20}$ alkyl groups, optionally substituted with an group $OR^2$, wherein $R^2$ corresponds to the formula (V) below:

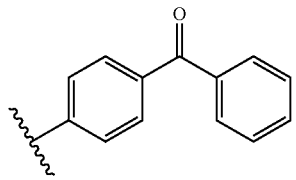
(V)

—C(=O)—$R^3$ groups, wherein the radical R3 is chosen from linear or branched $C_1$-$C_{20}$ groups;
-A-CH=$CH_2$ groups, wherein the radical A is chosen from:
a covalent bond,
a —C(=O)— group, or
a group of formula (VI) below:

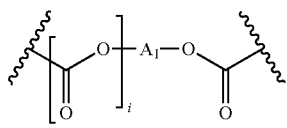
(VI)

wherein, i is 0 or 1 and $A_1$ represents a $C_1$-$C_{20}$ alkylene radical;

at least one co-initiator B chosen from compounds comprising at least one hydrogen atom bonded to a silicon atom; and at least one organopolysiloxane D comprising at least one (meth)acrylate group;

wherein the co-initiator B comprises at least 0.05 mole of functions Si—H per 100 g of co-initiator B, the ratio between the number of moles of radical photoinitiator A and the number of moles of Si—H functions of co-initiator B is greater than or equal to 0.5.

2. The composition C according to claim 1, wherein the co-initiator B comprises at least one siloxane bond and at least one hydrogen atom bonded to a silicon atom.

3. The composition according to claim 1, wherein the co-initiator B is chosen from organohydrogenpolysiloxanes.

4. The composition C according to claim 1, wherein the co-initiator B comprises at least 0.08 moles of Si—H functions per 100 g of co-initiator B.

5. The composition C according to claim 1, wherein
the radical photoinitiator A is selected from compounds (3), (4), (5), (6), (7), (7bis), (8), (9), (10), (11), (12), (13), (15) and (17) of the following formulas:

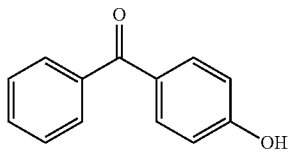
(3)

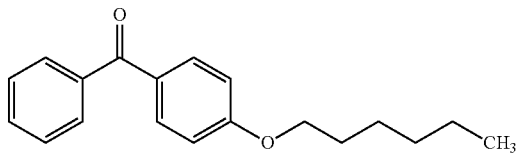
(4)

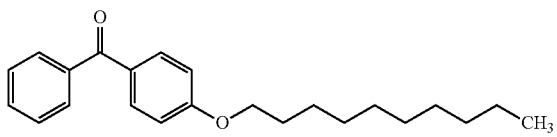
(5)

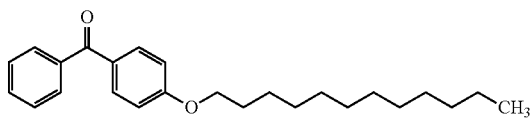
(6)

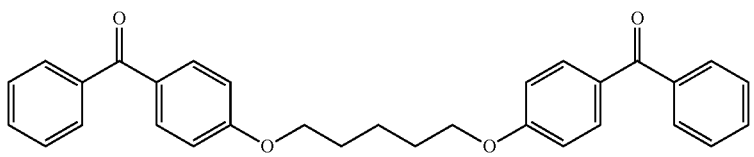
(7)

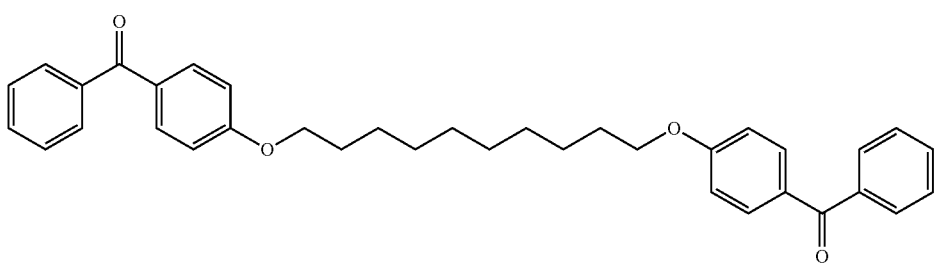
(7bis)

(8)
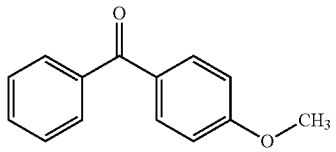

(9)
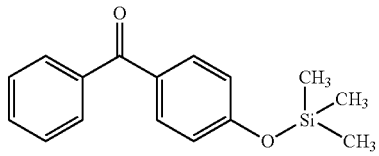

(10)
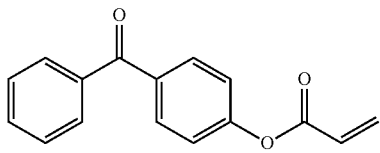

(11)
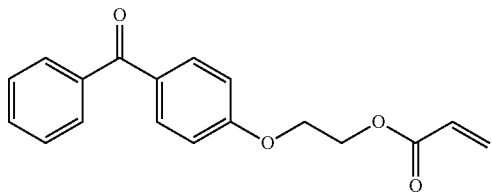

(12)
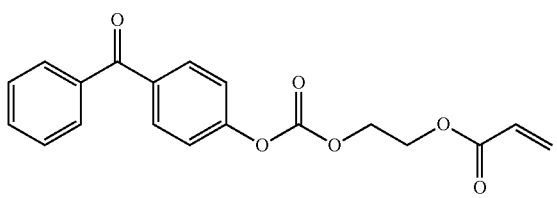

(13)
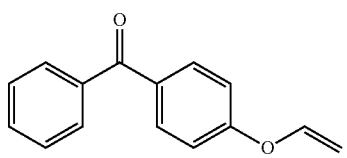

(15)
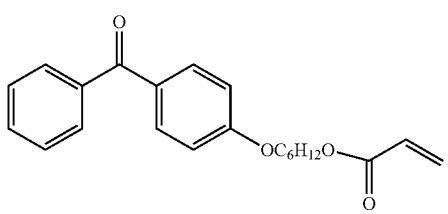

(17)
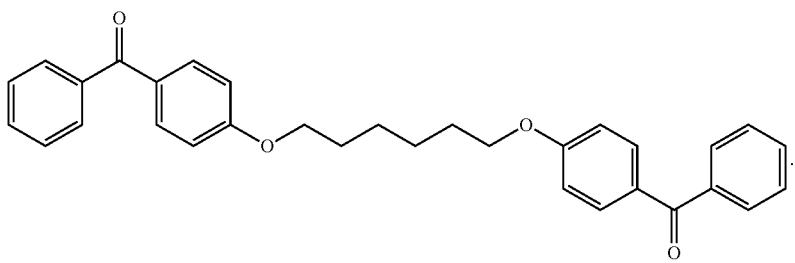

6. The composition C according to claim 1, wherein the organopolysiloxane D comprises:
   a1) at least one unit of formula (I) below:

$$R_a Z_b SiO_{(4-a-b)/2} \quad (I)$$

wherein:
   R, identical or different, are each represented by a linear or branched $C_1$-$C_{18}$ alkyl group, a $C_6$-$C_{12}$ aryl or aralkyl group, optionally substituted with halogen atoms, or an —$OR^4$ alkoxy radical, wherein $R^4$ is a hydrogen atom or a hydrocarbon radical comprising from 1 to 10 carbon atoms,
   Z are monovalent radicals of formula -y-(Y')n wherein:
   y represents a linear or branched $C_1$-$C_{18}$ alkylene polyvalent radical optionally extended by bivalent oxyalkylene or $C_1$-$C_4$ polyoxyalkylene radicals optionally substituted by a hydroxyl radical,
   Y' represents a monovalent alkenylcarbonyloxy radical, and
   n is 1, 2 or 3, and;
   a is an integer equal to 0, 1 or 2, b is an integer equal to 1 or 2 and the sum a+b=1, 2 or 3; and
   optionally a2) units of the following formula (II):

$$R_a SiO_{(4-a)/2} \quad (II)$$

wherein:
   R, identical or different, each represented by a linear or branched $C_1$-$C_{18}$ alkyl group, a $C_6$-$C_{12}$ aryl or aralkyl group, optionally substituted with halogen atoms, and
   a is an integer equal to 0, 1, 2 or 3.

7. The composition C according to claim 1, wherein the ratio between the number of moles of radical photoinitiator A and the number of moles of Si—H functions of co-initiator B is between 0.5 and 20.

8. The composition C according to claim 1, wherein the concentration of Si—H functions is less than or equal to 0.01 mol per 100 g of composition C.

9. The composition C according to claim 1, wherein the concentration of radical photoinitiator A is between 0.0003 and 0.015 mole per 100 g of composition C.

10. A silicone elastomer obtained by crosslinking a composition C according to claim 1.

11. A method for preparing silicone films with non-stick properties, comprising a step of crosslinking a composition C according to claim 1.

12. The method according to claim 11, wherein the crosslinking step is carried out under an air or inert atmosphere.

13. The method according to claim 11, wherein the crosslinking step is carried out by exposure to radiation with a wavelength between 200 nm and 450 nm.

14. The method for preparing a coating on a substrate, comprising the steps of:
   application of a composition C, according to claim 1, on a substrate, and
   crosslinking of the composition by exposure to radiation with a wavelength between 200 nm and 450 nm.

15. A coated substrate obtained by the method according to claim 14.

16. The composition C according to claim 1, wherein the ratio between the number of moles of radical photoinitiator A and the number of moles of Si—H functions of co-initiator B is between 1 and 10.

17. The composition C according to claim 1, wherein the concentration of Si—H functions is between 0.0002 and 0.01 mol per 100 g of composition C.

18. The composition C according to claim 1, wherein the radical photoinitiator A has the formula:

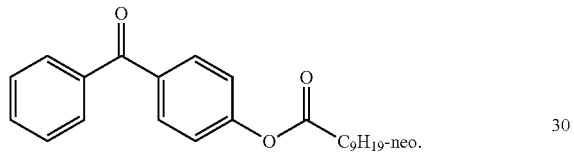

* * * * *